(12) United States Patent
Kossett

(10) Patent No.: US 7,766,311 B2
(45) Date of Patent: Aug. 3, 2010

(54) WIREFORM LOCKING DEVICE

(75) Inventor: John Alan Kossett, Vadnais Heights, MN (US)

(73) Assignee: Takonix Incorporated, Chisago City, MN (US)

( * ) Notice: Subject to any disclaimer, the term of this patent is extended or adjusted under 35 U.S.C. 154(b) by 0 days.

(21) Appl. No.: 12/182,807

(22) Filed: Jul. 30, 2008

(65) Prior Publication Data

US 2009/0031773 A1 Feb. 5, 2009

Related U.S. Application Data

(60) Provisional application No. 60/962,572, filed on Jul. 30, 2007.

(51) Int. Cl.
*F16C 1/10* (2006.01)
(52) U.S. Cl. .................... 267/154; 267/155; 74/97.1
(58) Field of Classification Search ............... 188/67; 267/154–157, 173; 16/322; 74/97.1, 469
See application file for complete search history.

(56) References Cited

U.S. PATENT DOCUMENTS

| | | | |
|---|---|---|---|
| 1,185,467 A | | 5/1916 | Beauchamp |
| 2,435,987 A | * | 2/1948 | Tierney et al. ............ 70/153 |
| 2,459,012 A | * | 1/1949 | Barth ...................... 74/526 |
| 2,865,045 A | * | 12/1958 | Miller ..................... 16/322 |
| 2,890,477 A | * | 6/1959 | Miller ..................... 16/322 |
| 3,500,701 A | * | 3/1970 | Gussenbauer et al. ...... 74/513 |
| 3,559,232 A | * | 2/1971 | Crane ..................... 16/50 |
| 3,874,480 A | | 4/1975 | Porter |
| 3,982,446 A | | 9/1976 | Van Dyken |
| 4,137,793 A | | 2/1979 | Sowell |
| 4,254,976 A | * | 3/1981 | Shoberg ................... 292/292 |
| 4,256,197 A | | 3/1981 | Kiser, Jr. |
| 4,287,785 A | | 9/1981 | Hunt |
| D267,085 S | | 11/1982 | Kiser, Jr. |
| 4,364,283 A | | 12/1982 | Ricardo |
| 4,411,339 A | | 10/1983 | Porter |
| 4,425,987 A | | 1/1984 | Porter |
| D273,101 S | | 3/1984 | Kiser, Jr. |
| 4,457,406 A | | 7/1984 | Porter |
| 4,569,239 A | | 2/1986 | Shirley |
| 4,577,730 A | | 3/1986 | Porter |
| 4,580,537 A | | 4/1986 | Uchiyama |
| 4,587,937 A | | 5/1986 | Masuda |
| 4,610,230 A | | 9/1986 | Saito |
| 4,611,561 A | | 9/1986 | Suyama |
| 4,620,575 A | | 11/1986 | Cuba |
| 4,645,027 A | | 2/1987 | Masuda |
| 4,697,673 A | * | 10/1987 | Omata ..................... 188/291 |
| 4,796,716 A | | 1/1989 | Masuda |
| 4,830,151 A | * | 5/1989 | Numata .................... 188/290 |
| 4,880,084 A | | 11/1989 | Tanaka |
| 4,966,247 A | | 10/1990 | Masuda |
| 5,150,771 A | | 9/1992 | Porter |
| 5,157,826 A | | 10/1992 | Porter |

(Continued)

*Primary Examiner*—Christopher P Schwartz
(74) *Attorney, Agent, or Firm*—Sherrill Law Offices, PLLC; Elizabeth D. Lewen

(57) ABSTRACT

A device for providing rotational and axial locking capability using a wireform with at least one wrap. The device requires very low actuation forces. The wireform can be constructed with end features that provide a specific tension such that when the device is engaged a differential slip torque in a clockwise and counterclockwise rotational direction is developed.

13 Claims, 39 Drawing Sheets

U.S. PATENT DOCUMENTS

| | | |
|---|---|---|
| 5,219,045 A | 6/1993 | Porter |
| 5,333,515 A | 8/1994 | Schneider |
| 5,441,129 A | 8/1995 | Porter |
| 5,471,699 A * | 12/1995 | Shaw .................. 15/146 |
| 5,568,843 A | 10/1996 | Porter |
| 5,893,295 A | 4/1999 | Bronnert |
| 6,135,227 A | 10/2000 | Laning |
| 6,250,173 B1 | 6/2001 | Huston |
| 6,318,490 B1 | 11/2001 | Laning |
| 6,820,710 B2 | 11/2004 | Fechner |
| 6,935,626 B2 * | 8/2005 | Champ .................. 267/70 |

* cited by examiner

WIREFORM LOCKING DEVICE

CROSS REFERENCE TO RELATED APPLICATIONS

This application claims priority to U.S. Provisional Application No. 60/962,572 filed on Jul. 30, 2007, entitled WIRE FORM LOCKING DEVICE, the disclosure of which is incorporated by reference herein in its entirety.

TECHNICAL FIELD

The present disclosure relates generally to locking devices. More specifically, the present disclosure relates to a locking device having an actuatable wireform that provides at least one of a rotational and an axial locking capability to a securing surface.

BACKGROUND

Locking devices can be used to hold a rotational position, an axial position, or both. For example, it is typical to use a tapered nut on a stand of a microphone, however it can be difficult to release if a previous user has tightened the nut with excessive force. In a second example, a toggle clamp is frequently utilized for securing adjustable seats or bicycle seats; however this type of locking device requires a complete disengagement to proceed with the adjustment.

For these and other reasons alternative locking devices that can be used to hold a rotational position, an axial position, or both are desired.

SUMMARY

In one aspect a wireform clamp locking device is disclosed. The wireform clamp locking devices comprising: a body section having a first aperture; a rotatable cylinder positioned through the first aperture of the body section; a lever pivotally connected to the body section; and a shaped wireform having at least one wrap of a wrapped section selectively engageable to a surface of the cylinder, wherein a first end of the wireform is connected to the lever and a second end of the wireform is connected to a portion of the body section, and wherein the locking device can be mounted to a hand throttle of a motorcycle to hold the throttle in a constant position when the device is in the engaged position.

In a second aspect a wireform locking device is disclosed. The wireform locking device comprising: a rotatable cylinder having a passage defined therethrough; a cylindrical body section positioned in the cylinder passage; a rotatable cam integrally formed with the body section, wherein a knob is utilized to rotate the cam; and a shaped wireform positioned externally with respect to the body section having at least one wrap of a wrapped section, wherein rotation of the cam provides selective engagement to an inner surface of the passage of the cylinder.

Examples representative of a variety of aspects are set forth in the description that follows. The aspects relate to individual features as well as combinations of features. It is to be understood that both the forgoing general description and the following detailed description merely provide examples of how the aspects may be put to into practice, and are not intended to limit the broad spirit and scope of the aspects.

DESCRIPTION OF THE DRAWINGS

Aspects of the disclosure may be more completely understood in consideration of the following detailed description of various embodiments of the disclosure in connection with the accompanying drawings, in which.

DETAILED DESCRIPTION

The present disclosure relates generally to locking devices. More specifically, the present disclosure relates to a locking device having an actuatable wireform that provides at least one of a rotational and an axial locking capability to a securing surface. In general, locking devices in accordance with the principles of the present disclosure include a tensioned wireform that when actuated develops a differential frictional force on a securing surface having at least a rotational degree of freedom such that application of a directionally specific magnitude of torque is required to rotate the securing surface.

In the following detailed description, directional terminology such as top, bottom, front, back, clockwise (CW) and counterclockwise (CCW) will be employed to establish a frame of reference of the various example embodiments. The directional terminology is used only for the purpose of explanation and should not to be construed as limiting. Additionally, it will be appreciated that structural or logical device variation may be realized without departing from the scope of the present disclosure.

Figure 1:
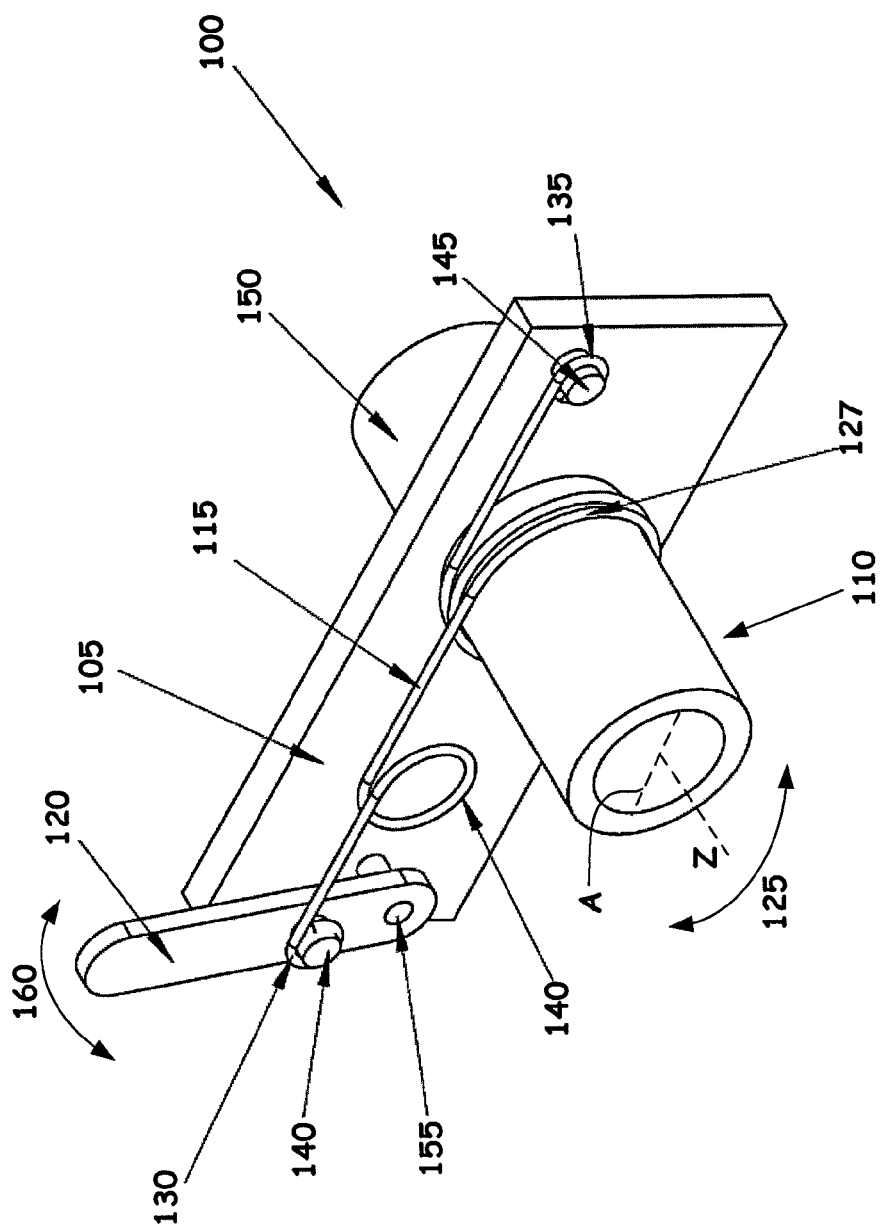
FIG. 1 is a perspective view of an example external wireform rotational locking device shown in a disengaged position.
Figure 2:
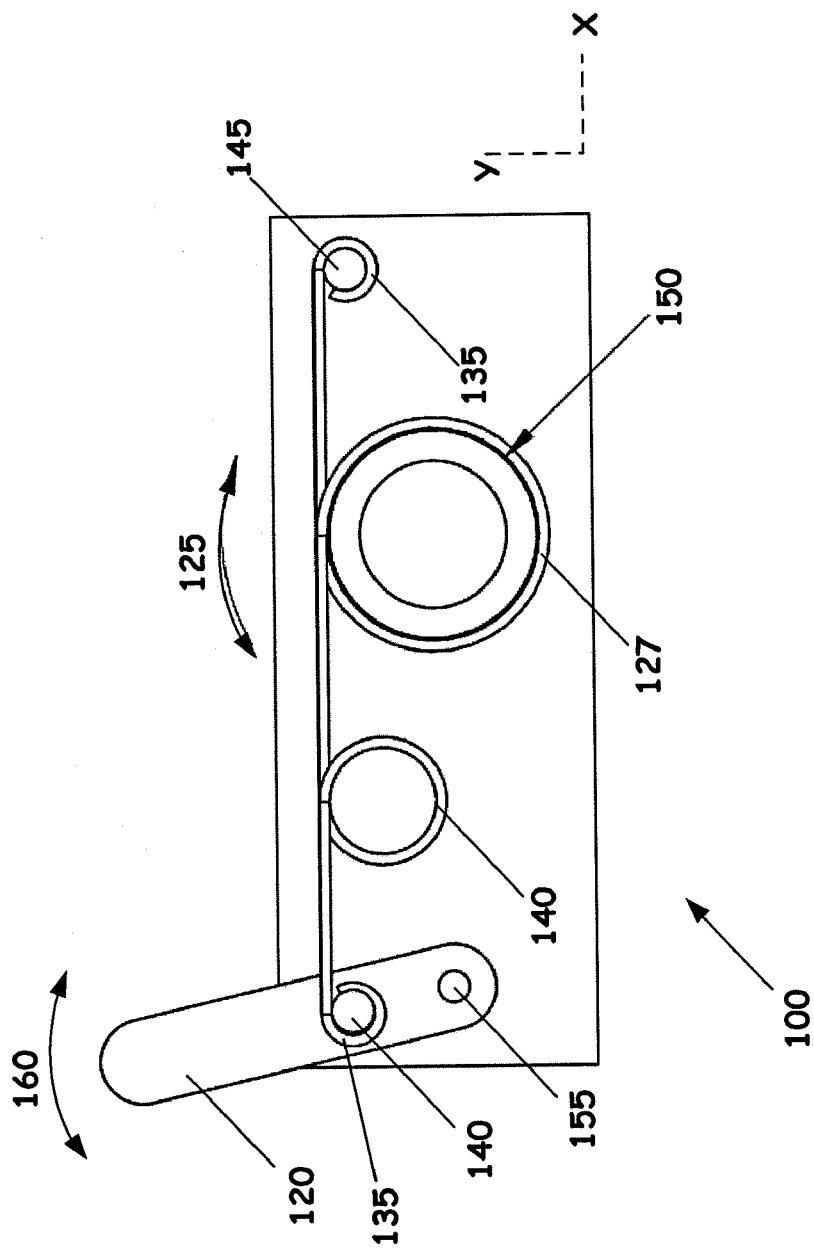
FIG. 2 is a frontal view of the locking device of FIG. 1 in the disengaged position.
Figure 3:
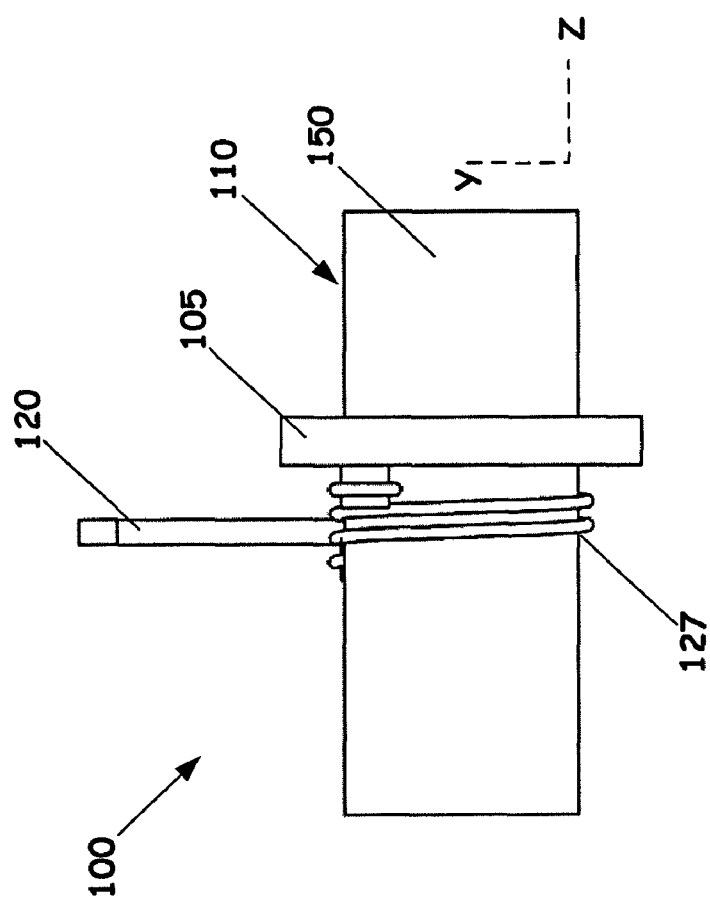
FIG. 3 is a side view of the locking device of FIG. 1 in the disengaged position.

Referring now to FIGS. 1-3, an example locking device 100 having an external wireform is depicted in a disengaged position.

The locking device 100 includes a body section 105, a cylinder 110 having an optional passage of diameter A, a wireform 115, and a lever 120. In general, the cylinder 110 is disposed through the body section 105 along an axis Z, and is configured such that it can rotate freely in directions 125. In one embodiment, the cylinder 110 is disposed through a first aperture (not shown) defined in the body section 105. In one example embodiment, the wireform 115 is shaped and formed from a resilient material such as a steel alloy. The wireform 115 includes a wrapped section 127, a first end 130, a second end 135 and a tension section 140. As will be described in further detail below, the wireform 115 is extensible in that it can be stretched or extended along a lengthwise direction without compromising its structural integrity or causing a permanent deformation.

In general, the wireform 115 is positioned in contact to the locking device 100. For example, in one embodiment the first end 130 of the wireform 115 is connectively engaged to a first pin 140 that is integrally formed with the lever 120. Similarly, the second end 135 of the wireform 115 is engaged to a second pin 145 that is rigidly formed with the body section 105. The wrapped section 127 of the wireform 115 includes one or more wraps that can be selectively engaged to an outer surface 150 of the cylinder 110. In the example embodiment, a single wrap is defined as one complete loop around the outer circumference of the cylinder 110. A locking device 100 in the disengaged position has the wrapped section 127 loosely engaged to the outer surface 150 of the cylinder 110 such that the cylinder 110 can rotate in directions 125 equally with minimal resistance. The lever 120 is pivotally connected to the body section 105 via a pivot pin 155 such that the lever 120 can swivel in directions 160. In general, the lever 120 can be selectively rotated between an engaged position and a disengaged position by the operator to repeatedly engage and disengage the locking device 100.

Figure 4:
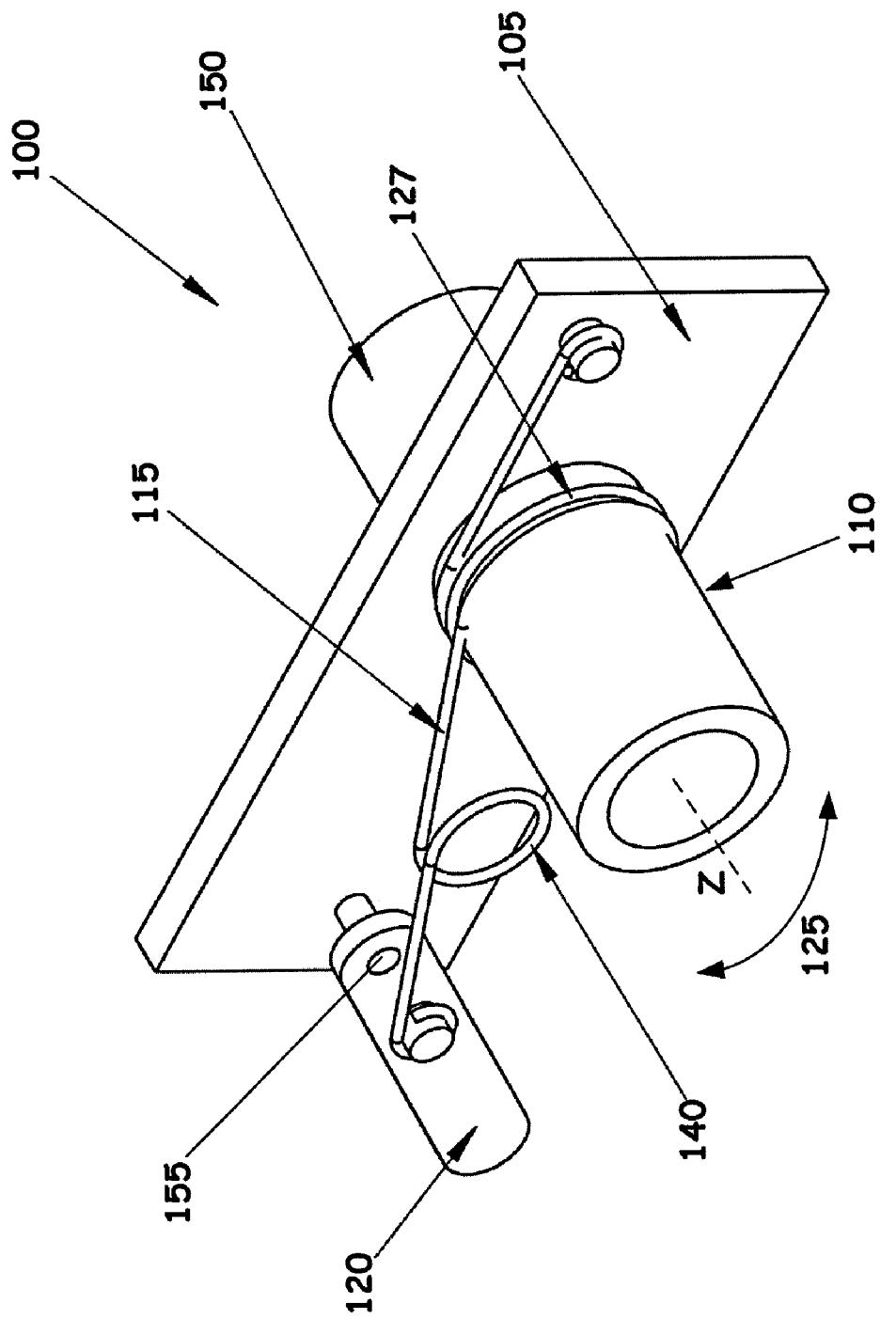
FIG. 4 is a perspective view of the example external wireform locking device of FIG. 1 shown in an engaged position.
Figure 5:
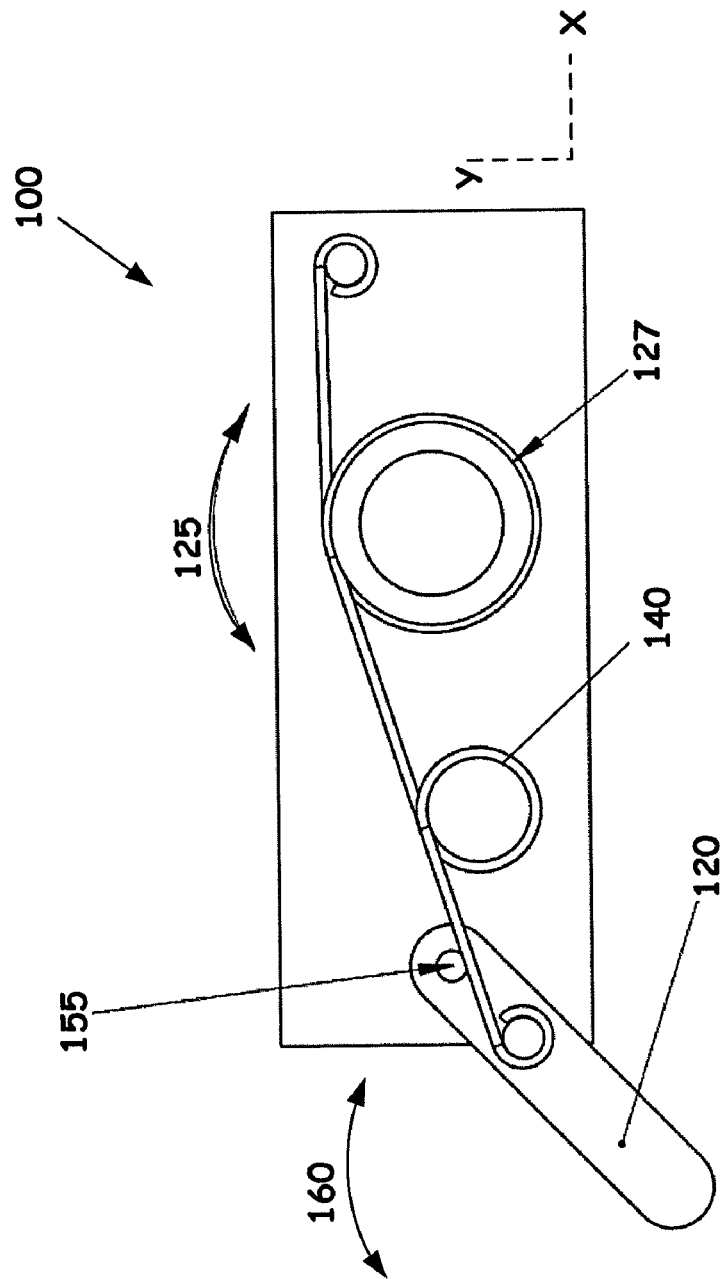
FIG. 5 is a frontal view of the locking device of FIG. 4 in the engaged position.
Figure 6:
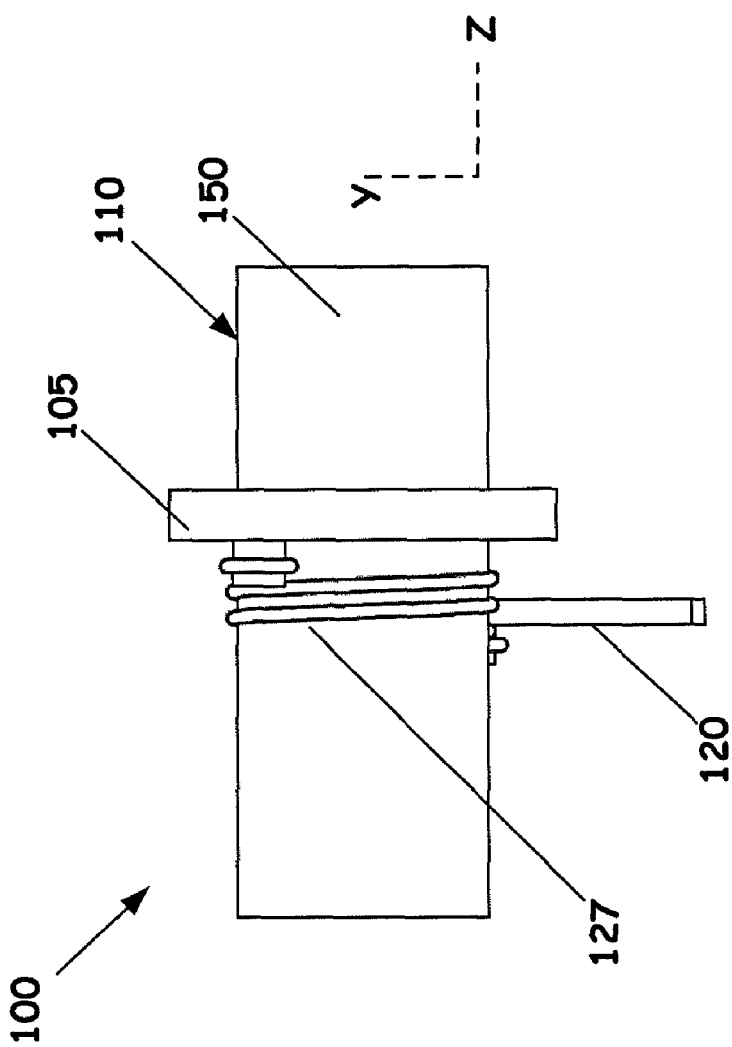
FIG. 6 is a side view of the locking device of FIG. 4 in the engaged position.

Referring now to FIGS. 4-6, the example locking device 100 as described with reference to FIGS. 1-3 is shown in an engaged position.

In the example shown, the lever 120 has been rotated, or equivalently moved, in a CCW direction about the pivot pin 155 such that the tension section 140 provides a specific tension on the wrapped section 127. More specifically, when the lever 120 is rotated, the wrapped section 127 is loaded by the specific tension of the tension section 140 such that the wrapped section 127 is pulled into interference with the outer surface 150 of the cylinder 110. In this manner, a frictional force can be developed at the interface between the wrapped section 127 and the outer surface 150 such that a directionally specific torque of sufficient magnitude must be applied to rotate the cylinder in directions 160. For example, due to the construction of the wireform 115 the cylinder 110 will rotate in the CCW direction under application of a specified magnitude of torque that is much higher than the torque required to rotate the cylinder in the CW direction, as a consequence of the lack of a tension section 140 between the wrapped section 127 and the second end 135. In general, the degree of frictional force that the wrapped section 127 imparts on the outer surface 150 of the cylinder 110 depends on the amount of force provided by tension section 140, the number of wraps in the wrapped section 127, the diameter of cylinder 110 and the coefficient of friction between cylinder 110 and the wrapped section 127.

Figure 7:
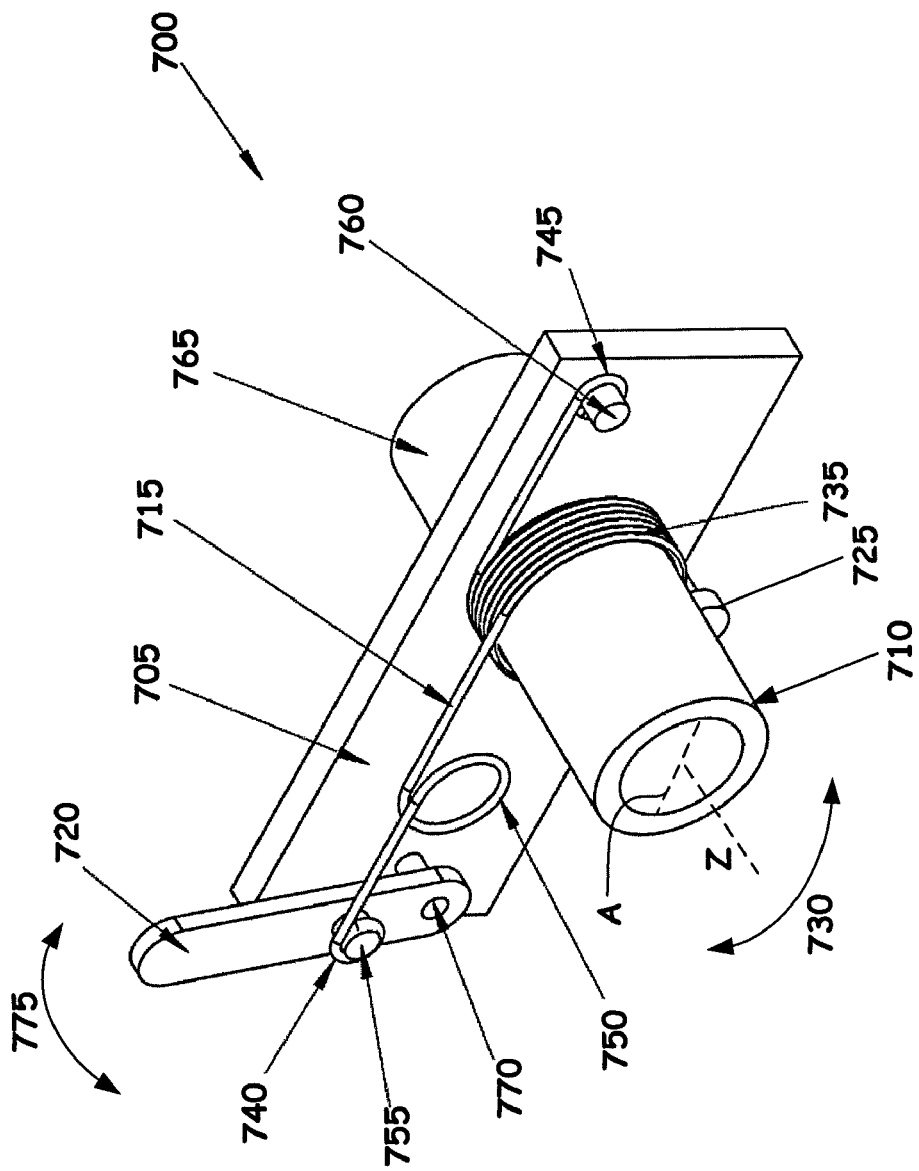
FIG. 7 is a perspective view of an example external wireform rotational and axial locking device shown in a disengaged position.
Figure 8:
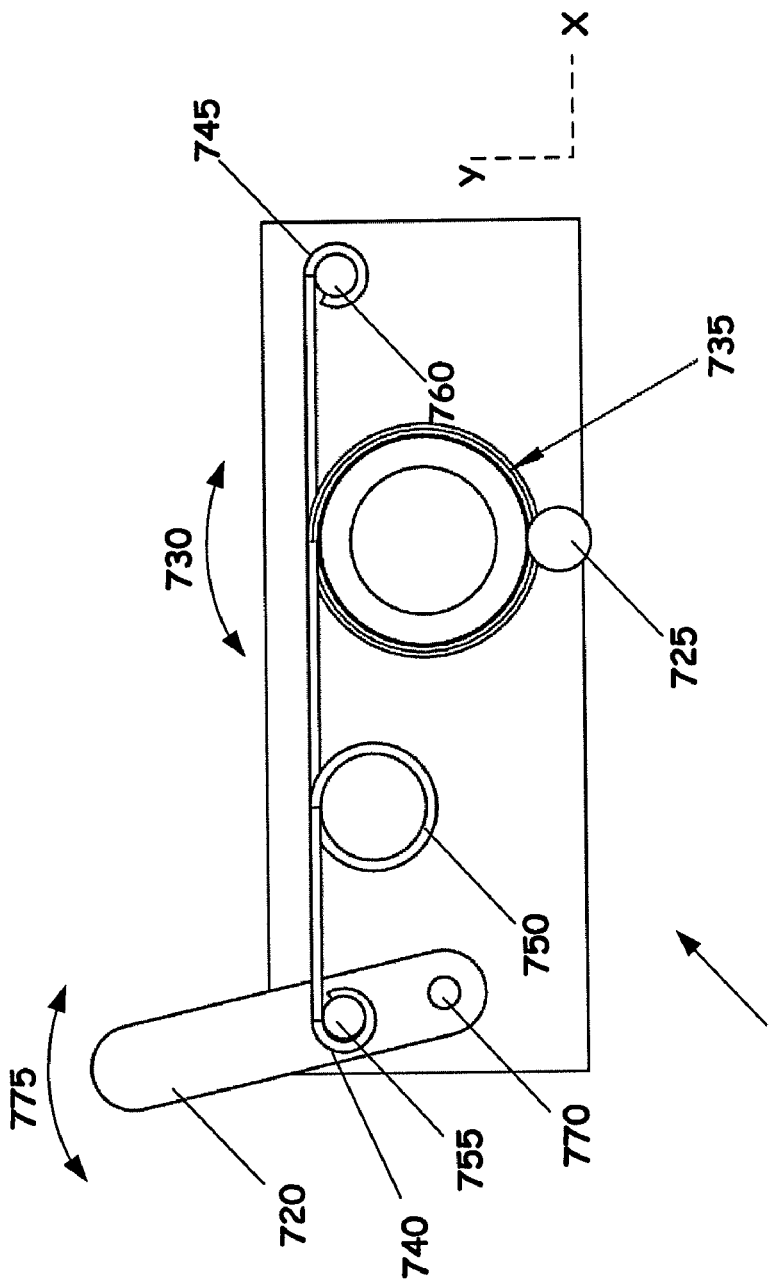
FIG. 8 is a frontal view of the locking device of FIG. 7 in the disengaged position.
Figure 9:
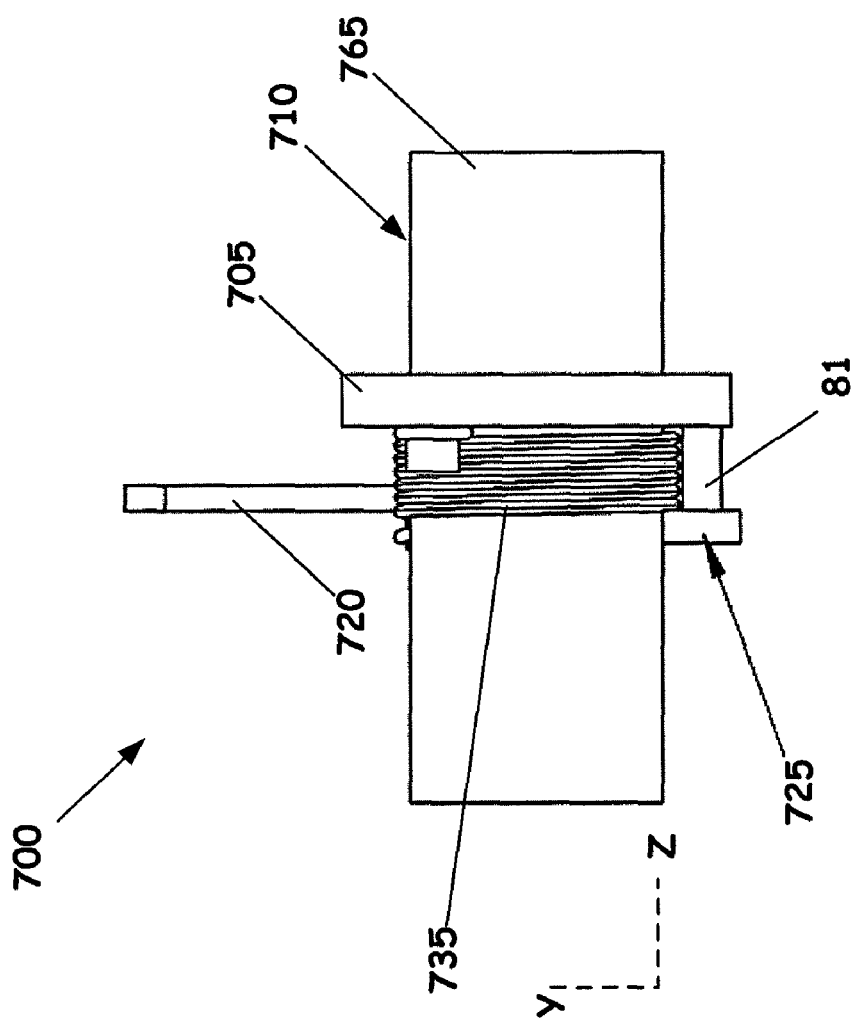
FIG. 9 is a side view of the locking device of FIG. 7 in the disengaged position.

Referring now to FIGS. 7-9 an alternative example locking device 700 having an external wireform is depicted in a disengaged position.

The locking device 700 includes a body section 705, a cylinder 710 having an optional passage of diameter A, a wireform 715, and a lever 720. In general, the cylinder 710 is disposed through the body section 705 along an axis Z, and is configured such that it can rotate freely in directions 730 or slide axially along the Z-axis when the locking device 700 is in the disengaged position. In one embodiment, the cylinder 710 is disposed through a first aperture (not shown) defined in the body section 705. In one example embodiment, the wireform 715 is shaped and formed from a resilient material such as a steel alloy. The wireform 715 includes a wrapped section 735, a first end 740, a second end 745 and a tension section 750. As will be described in further detail below, the wireform 715 is extensible in that it can be stretched or extended along a lengthwise direction without compromising its structural integrity or causing a permanent deformation.

In general, the wireform 715 is positioned in contact to the locking device 700. For example, in one embodiment the first end 740 of the wireform 715 is engaged to a first pin 755 that is integrally formed with the lever 720. Similarly, the second end 745 of the wireform 715 is engaged to a second pin 760 that is rigidly formed with the body section 705. The wrapped section 735 includes one or more wraps that can be selectively engaged to an outer surface 760 of the cylinder 710. A locking device 700 in the disengaged position has the wrapped section 735 loosely engaged to the outer surface 760 of the cylinder 710 such that the cylinder 710 can rotate in directions 730 equally or slide axially with minimal resistance. The lever 720 is pivotally connected to the body section 705 via a pivot pin 770 such that the lever 720 can swivel in directions 775. In general, the lever 720 can be selectively rotated between an engaged position and a disengaged position by the operator to repeatedly engage and disengage the locking device 700.

Figure 10:
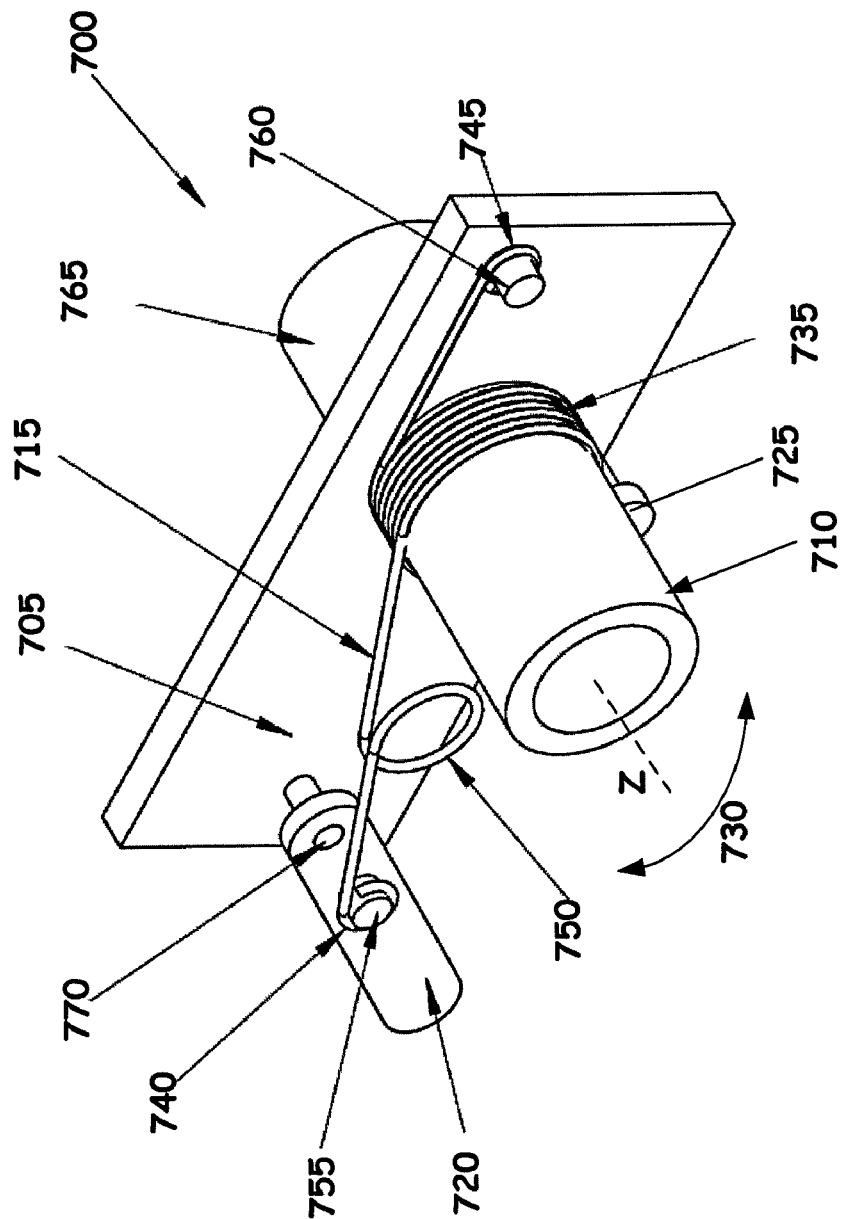
FIG. 10 is a perspective view of the example external wireform locking device of FIG. 7 shown in an engaged position
Figure 11:
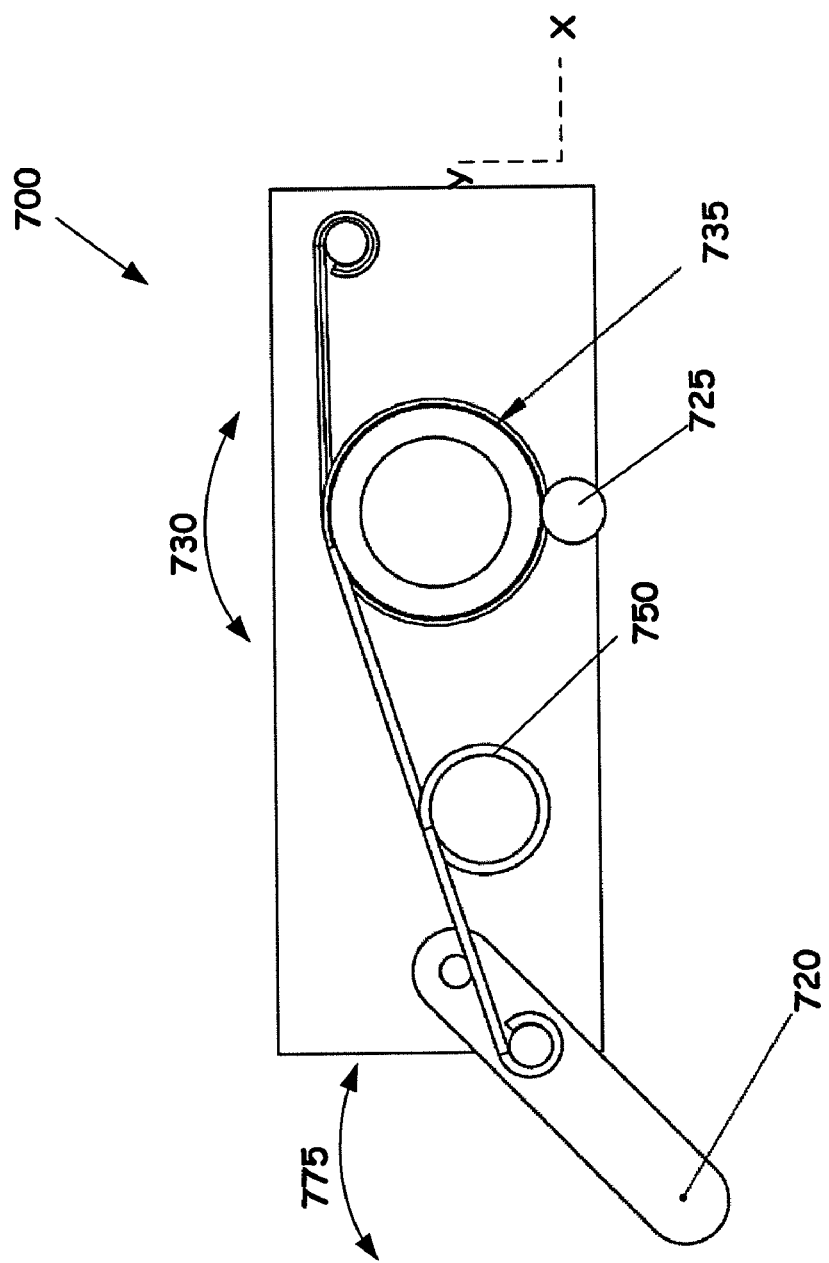
FIG. 11 is a frontal view of the locking device of FIG. 10 in the engaged position.
Figure 12:
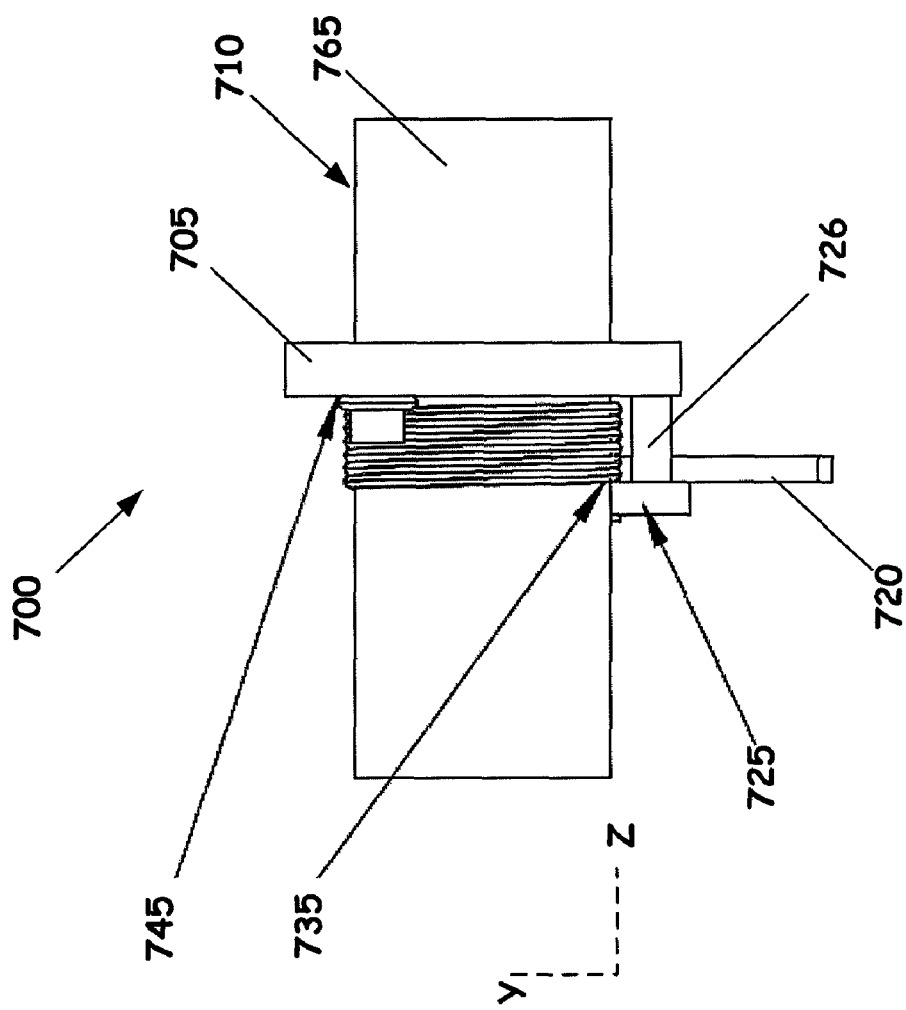
FIG. 12 is a side view of the locking device of FIG. 10 in the engaged position.
Figure 13:
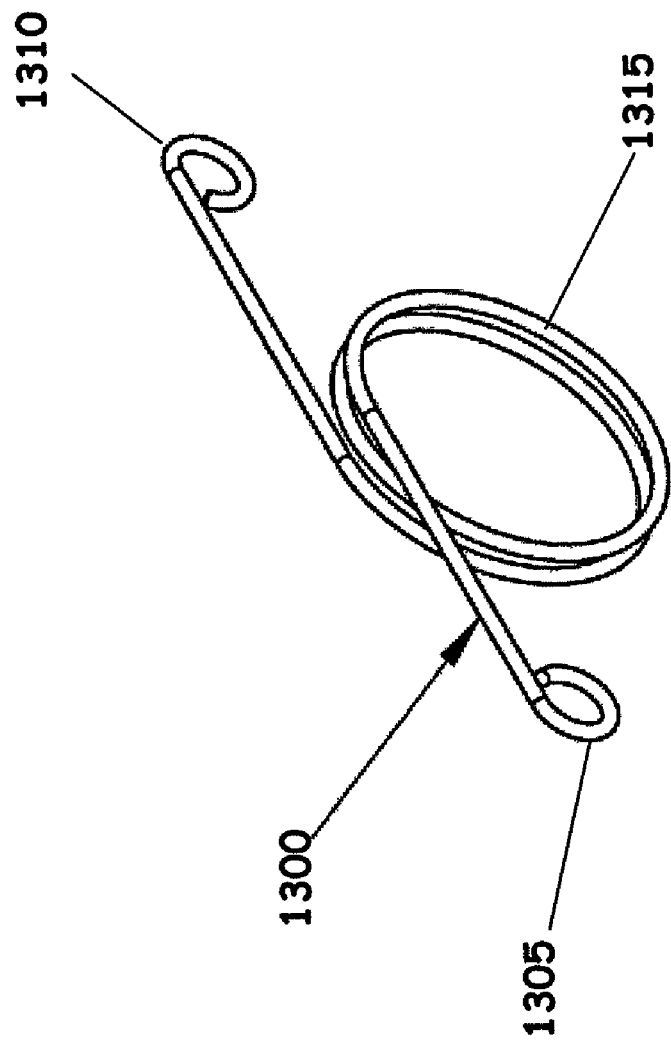
FIG. 13 is a first example embodiment of an external wireform construction.
Figure 14:
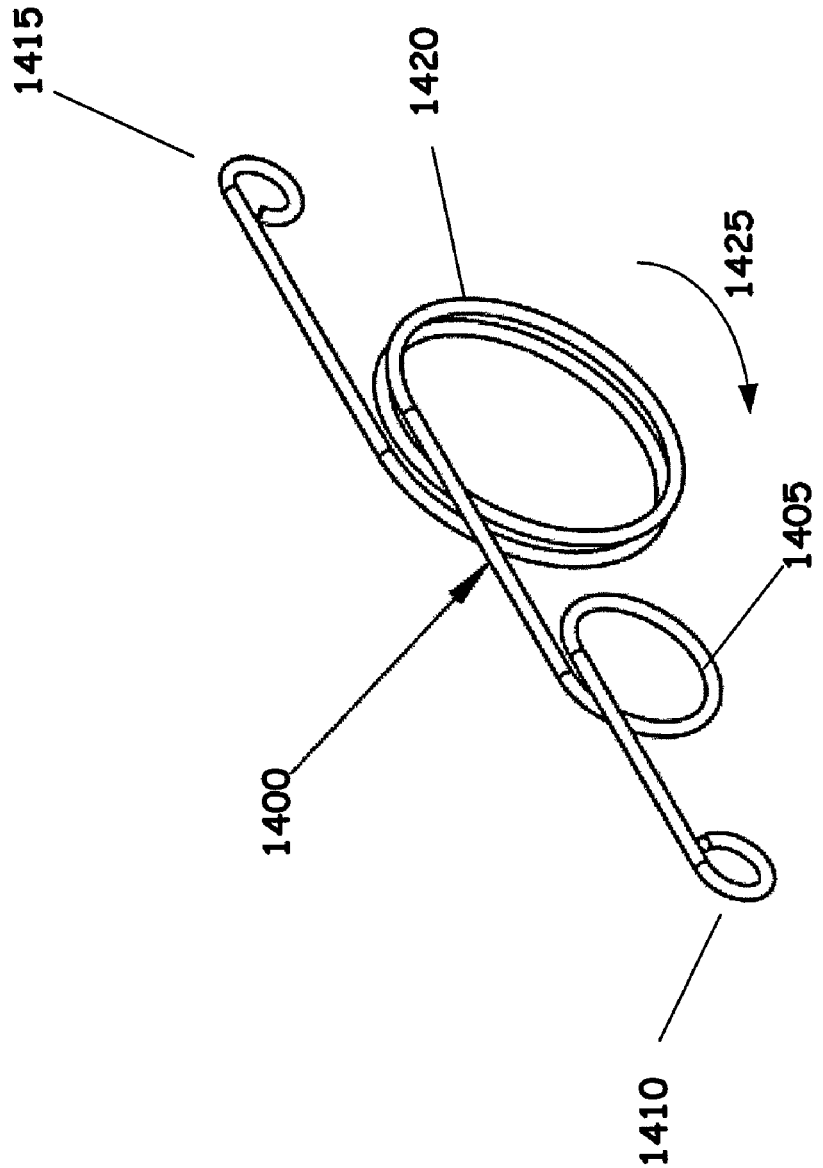
FIG. 14 is a second example embodiment of an external wireform construction.
Figure 15:
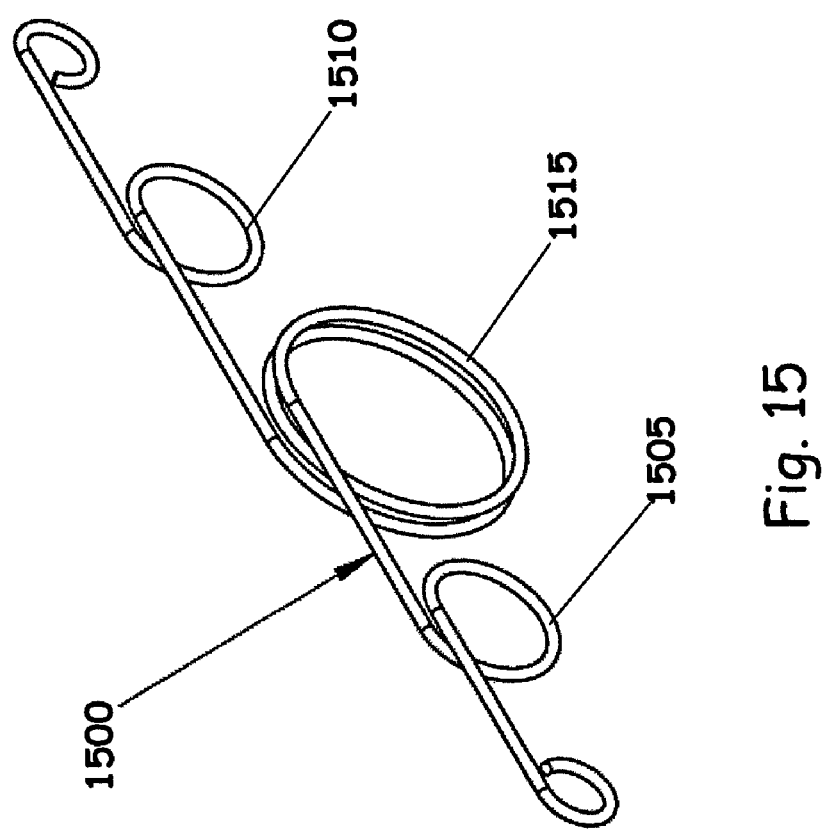
FIG. 15 is a third example embodiment of an external wireform construction.
Figure 16:
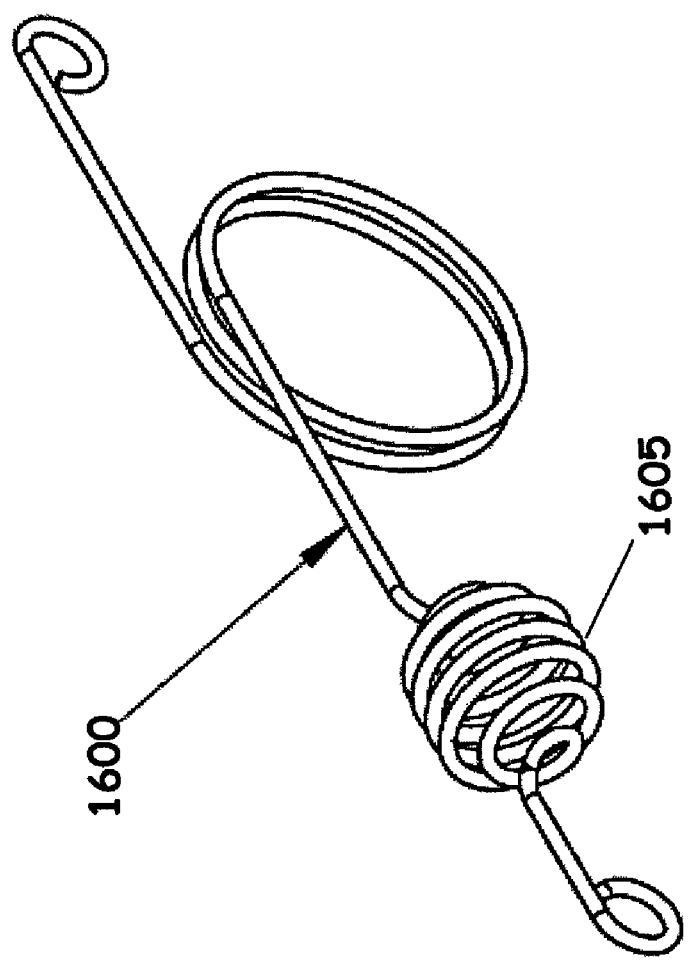
FIG. 16 is a fourth example embodiment of an external wireform construction.
Figure 17:
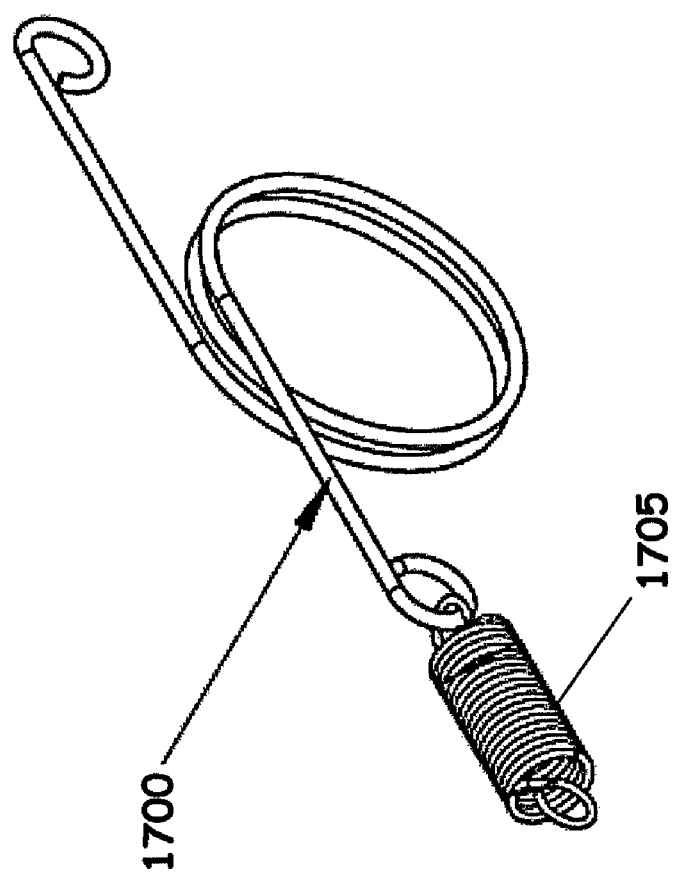
FIG. 17 is a fifth example embodiment of an external wireform construction.

Referring now to FIGS. 10-12, the example locking device 700 as described with reference to FIGS. 9-11 is shown in an engaged position.

In the example shown, the lever 720 has been rotated, or equivalently moved, in a CCW direction about the pivot pin 770 such that the tension section 750 provides a specific tension on the wrapped section 735. More specifically, when the lever 720 is rotated, the wrapped section 735 is loaded by the specific tension of the tension section 750 such that the wrapped section 735 is pulled into interference with the outer surface 765 of the cylinder 710. In this manner, a frictional force can be developed at the interface between the wrapped section 735 and the outer surface 765 such that a directionally specific torque of sufficient magnitude must be applied to rotate the cylinder 710 in directions 730. For example, due to the construction of the wireform 715, the cylinder 710 will rotate in the CCW direction under application of a specified magnitude of torque that is much higher than the torque required to rotate the cylinder 710 in the CW direction, as a consequence of the lack of a tension section between the wrapped section 735 and the second end 745. In general, the degree of frictional force that the wrapped section 735 imparts on the outer surface 765 of the cylinder 710 depends on the amount of force provided by tension section 750, the number of wraps in the wrapped section 735, the diameter of cylinder 710 and the coefficient of friction between cylinder 710 and the wrapped section 735.

It will be appreciated that the example locking device 700 is similar to the example locking device 100 described with respect to FIGS. 1-6, with the exception of an axial restraint 725, which is integrally formed with the body section 705. The axial restraint 725 includes a flange section 726 such that in the engaged position, when the wrapped section 735 is engaged tightly against cylinder 765, the wrapped section 735 is secured against the body section 105. This, in effect, prevents the cylinder 710 from moving axially along the Z-axis.

Referring now to FIGS. 13-17, alternative embodiments of wireform construction that can be used with the example locking device 100 (FIGS. 1-6) and example locking device 700 (FIGS. 7-12) are shown. In general, the wireform construction can be designed such that a specific magnitude of torque is required to rotate a cylinder in a given radial direction. Additionally, the wireform is extensible in that it may be stretched or extended along its length without compromising its structural integrity or causing a permanent deformation due to its construction, which keeps the material from exceeding the yield strength of the material. In general, any non-brittle material (e.g. steel, plastic) can be used as long as the material is strong enough to support the desired loads. Further, a single strand wireform or a multi-strand wireform may be utilized in the example wireforms depicted in FIGS. 13-17.

Wireform 1300 is one example wireform that does not incorporate a tension section between a wrapped section 1315 and either a first end 1305 or a second end 1310. A wireform such as wireform 1300 utilized in the example locking devices 100, 700 would require a relatively high and equal application of torque in both cylinder rotational directions to rotate a cylinder disposed through the wrapped section 1315.

Wireform 1400 is constructed with a tension section 1405 such that a cylinder disposed through the wrapped section 1420 will rotate in direction 1425 under application of a specified magnitude of torque that is much less than the torque required to rotate the cylinder in the opposite direction, due to the lack of a tension section between the wrapped section 1420 and second end 1415.

Wireform 1500 is an example illustrating two respective tension sections, 1505, 1510 such that a similar application of force would be required to rotate a cylinder disposed through a wrapped section 1515 in each cylinder rotational direction. In general, the amount of torque required to rotate the cylinder in a give direction can be modifiable by adjusting sections 1505 and 1510 to have a specified spring force constant.

Wireform 1600 has a tension section 1605 that illustrates one of many potential variations for constructing a respective tension section.

Wireform 1700 is attached to a separate wireform 1705 as an alternative method to provide the tension of a tension section. In the example shown, the tension section is constructed as a spring that may be interchangeably removable.

Figure 18:
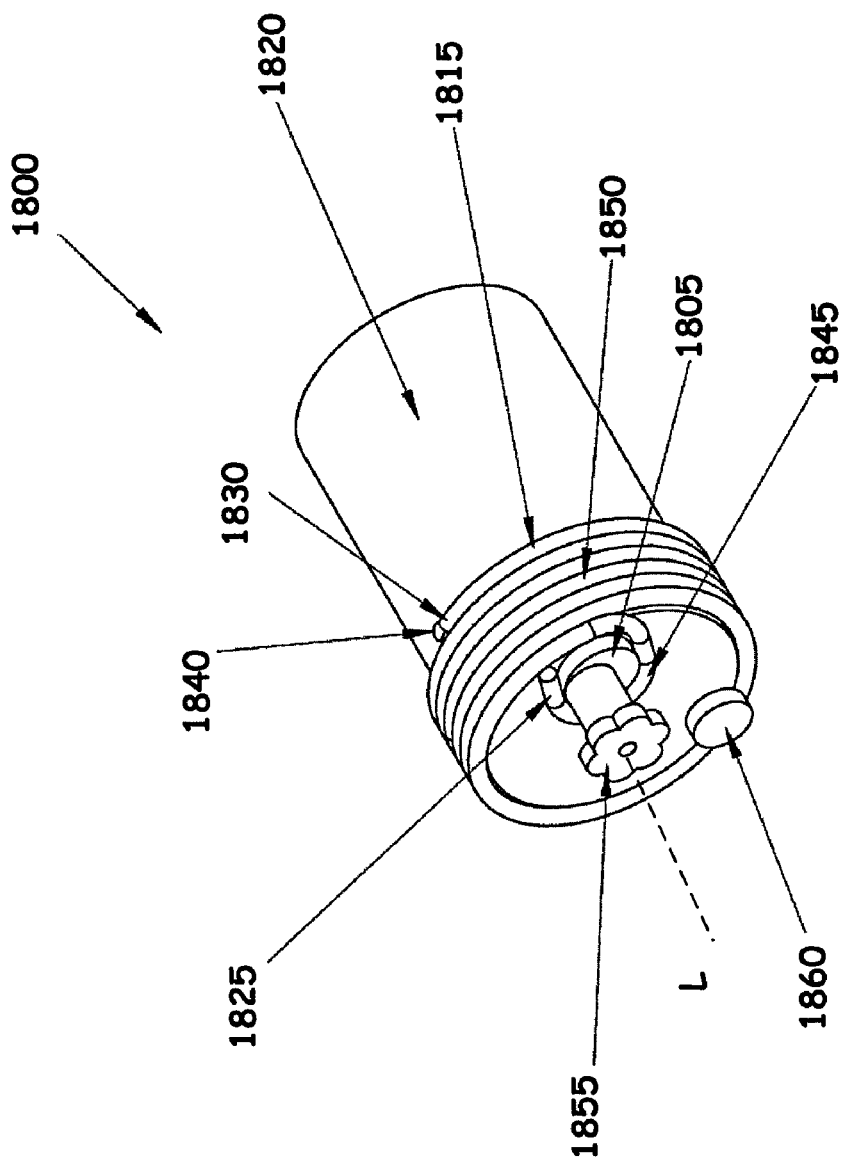
FIG. 18 is a perspective view of an example internal wireform rotational and axial locking device having a torque control feature shown without a hollow cylinder shaft.
Figure 19:
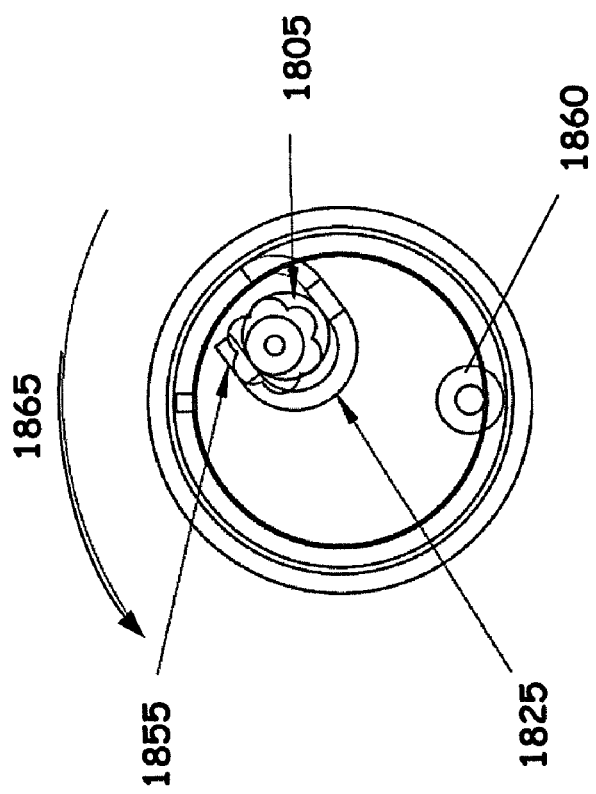
FIG. 19 is a frontal view of the locking device of FIG. 18.
Figure 20:
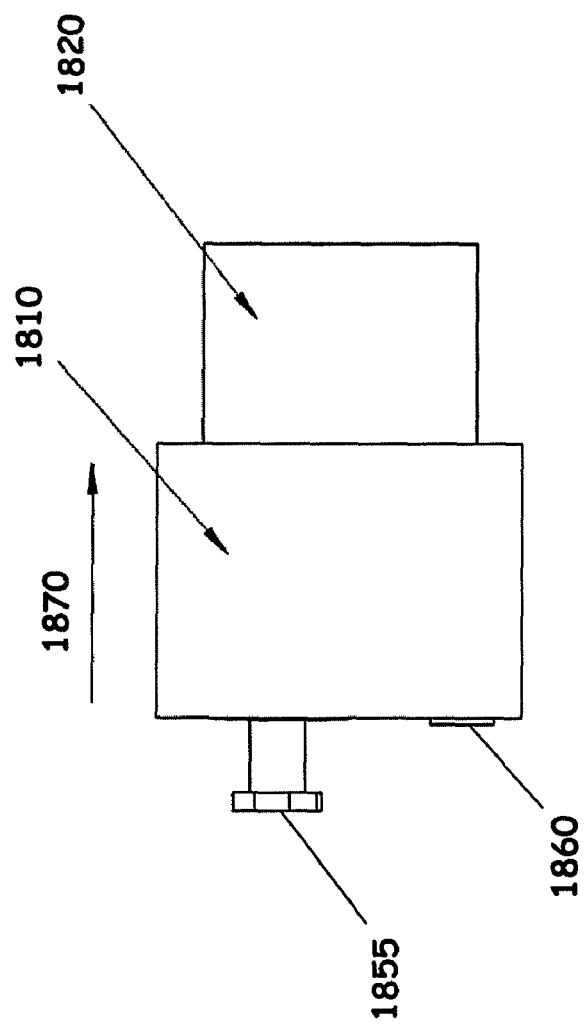
FIG. 20 a side view of the locking device of FIG. 18 shown with a cylinder.

Referring now to FIGS. 18-20 an example locking device 1800 having an internal wireform is depicted in a disengaged position.

In general, the example locking device 1800 is a rotational and axial locking device. The example locking device 1800 includes a cam 1805, a cylinder 1810 having a passage defined therethrough, a wireform 1815, and a cylindrical body section 1820. In general, the body section 1820 is positioned in the passage defined in the cylinder 1810.

The wireform 1815 is positioned externally with respect to body section 1820 and has a first end 1825 adjacent to the cam 1805 and a second end 1830 adjacent to a first pin 1840. Additionally, the wireform 1815 includes a tension section 1845 and one or more wraps 1850. In the example embodiment, a single wrap is defined as one complete loop within the inner circumference of the cylinder 1810.

The cam 1805 has a rotational degree of freedom in that it can pivot about an axis L defined with respect to the center of a knob 1855. In a disengaged position the cam 1805 does not apply a force against the first end 1825, thus the wireform 1815 is loosely positioned on the body section 1820 and not frictionally engaged with an inner surface of the passage defined in the cylinder 1810. In this manner, the cylinder 1810 can freely rotate or slide axially in any direction.

To engage the locking device 1800 the cam 1805 is rotated with respect to the axis by adjusting the knob 1855. In this manner, the cam 1805 pushes against the first end 1825, effectively deforming the tension section 1845 and causing the wireform 1815 to expand such that the wraps 1850 interfere with the inner surface of the passage defined in the cylinder 1810. In the engaged position only under application of a specific magnitude of torque can the cylinder 1810 by rotated in a CW direction. Additionally, in the engaged position the cylinder 1810 is secured at a designated rotational position by the first pin 1840, which prevents rotation of the cylinder 1810 the CCW direction 1865 and prevents axial movement of cylinder 1810 along a first axial direction 1870. The stop pin 1860 prevents axial movement in the direction opposite of the first axial direction 1870.

In general, the example locking device 1800 can repeatedly be actuated between an engaged position and a disengaged position by an operator by adjusting the knob 1855 through 180 degrees of rotation.

Figure 21:
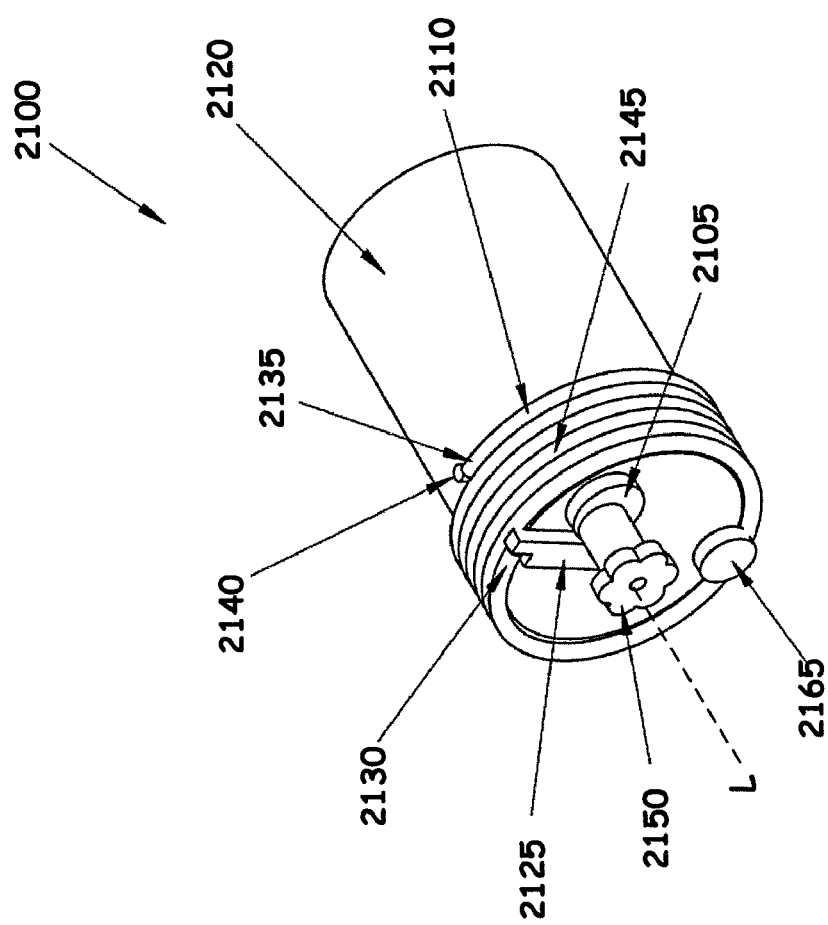
FIG. 21 is a perspective view of an alternate example internal wireform rotational and axial locking device shown without a cylinder.
Figure 22:
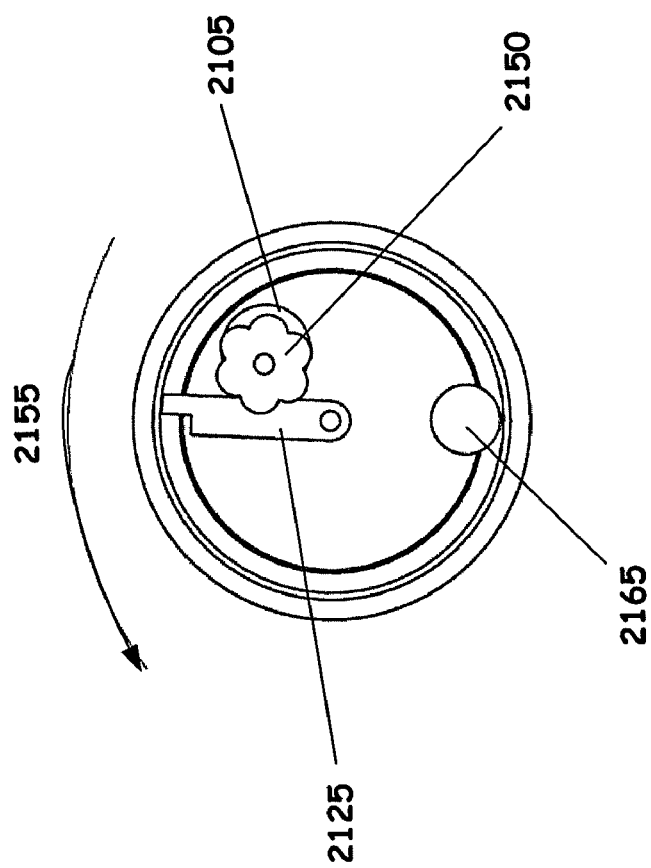
FIG. 22 is a frontal view of the locking device of FIG. 21.
Figure 23:
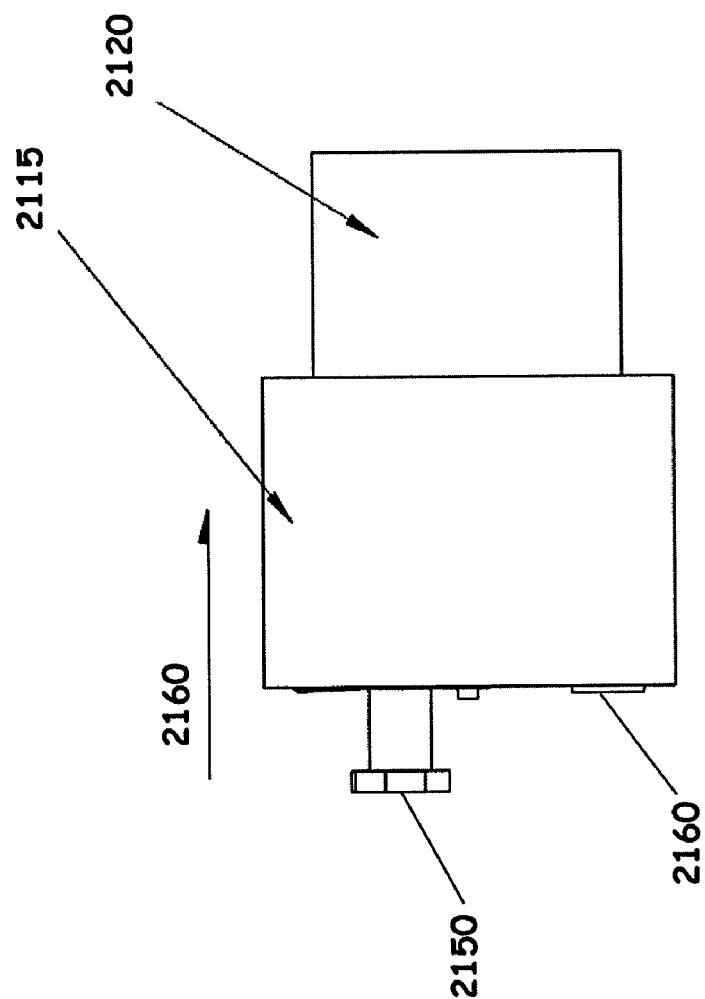
FIG. 23 a side view of the locking device of FIG. 21 shown with a cylinder.
Figure 24:
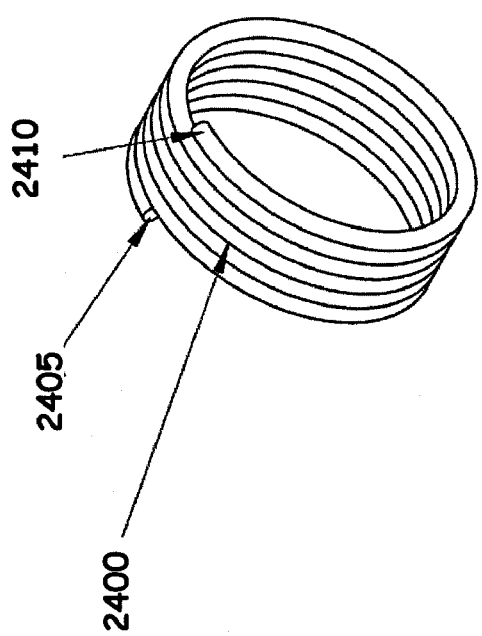
FIG. 24 is a perspective view of a first example embodiment of an external wireform construction.
Figure 25:
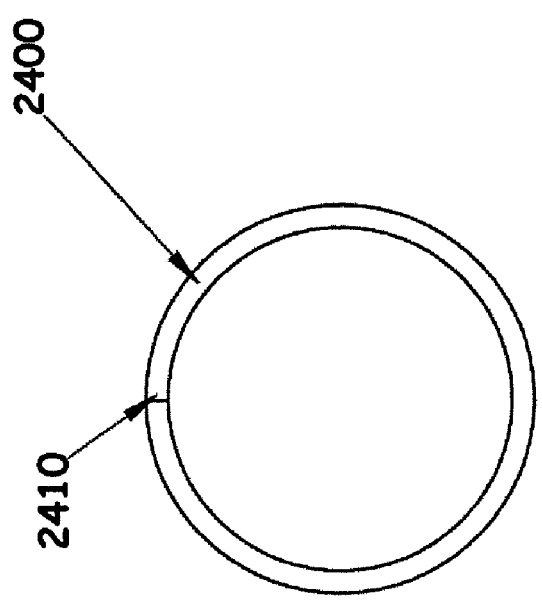
FIG. 25 is a frontal view of the wireform construction of FIG. 24.
Figure 26:
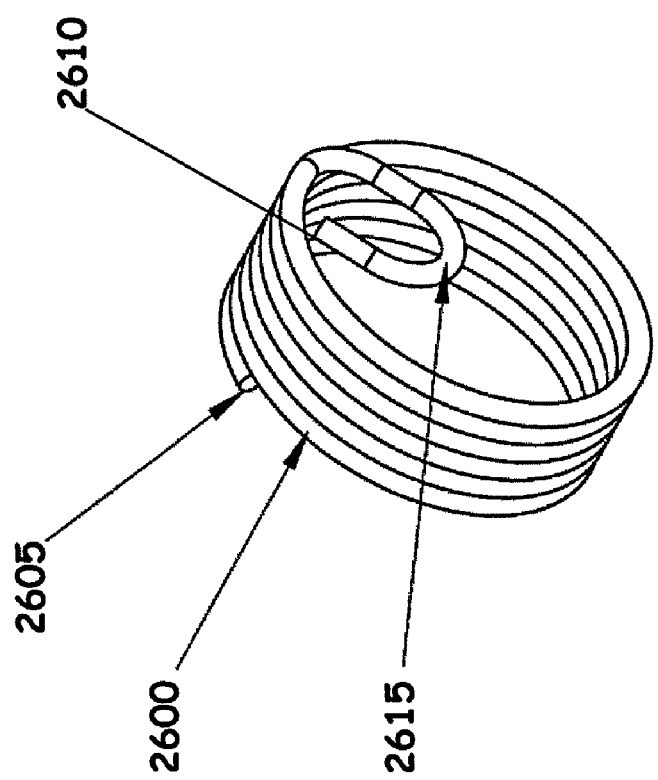
FIG. 26 is a perspective view of a second example embodiment of an external wireform construction.
Figure 27:
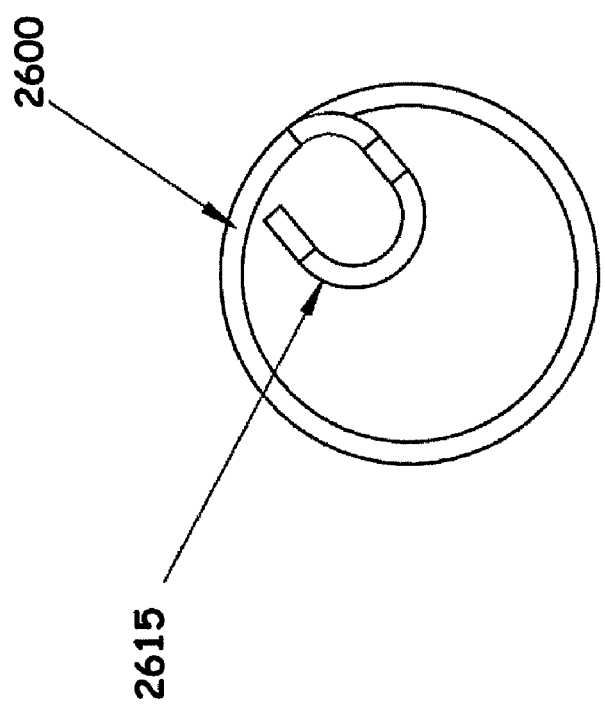
FIG. 27 is a frontal view of the wireform construction of FIG. 26.
Figure 28:
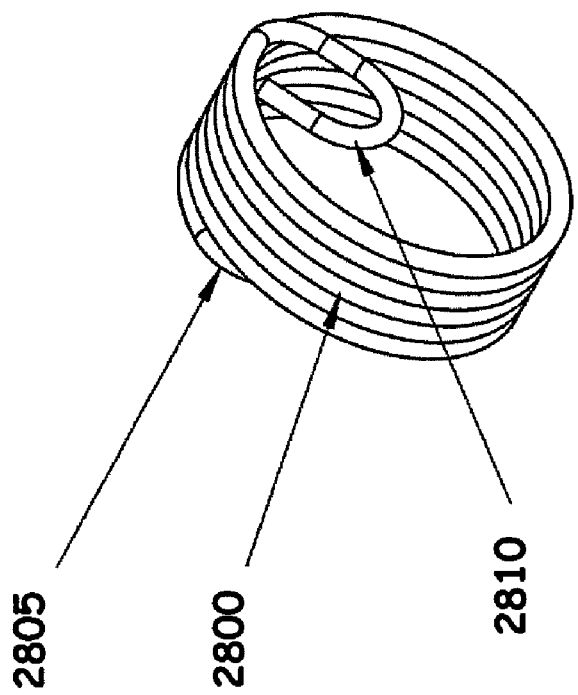
FIG. 28 is a perspective view of a third example embodiment of an external wireform construction.
Figure 29:
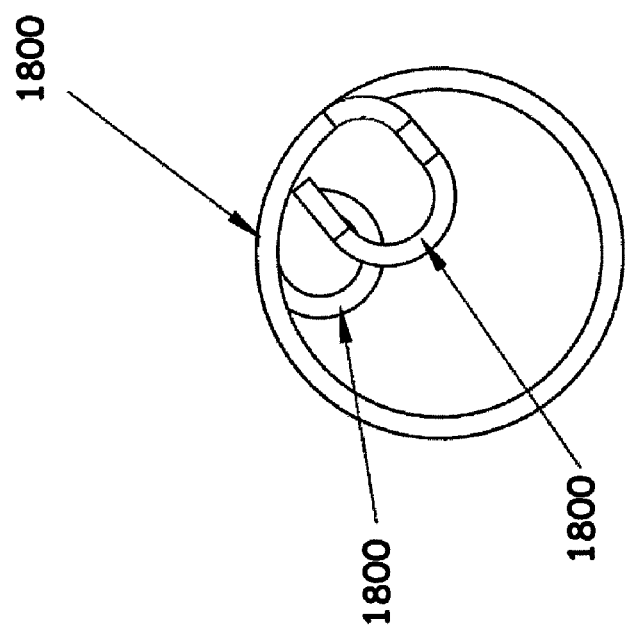
FIG. 29 is a frontal view of the wireform construction of FIG. 28.

Referring now to FIGS. 21-23 an alternative example locking device 2100 having an internal wireform is depicted in a disengaged position.

The example locking device 2100 includes a cam 2105, a wireform 2110, a cylinder 2115 having a passage defined therethrough, a body section 2120, and a lever 2125. In general, the body section 2120 is positioned within the passage defined in the cylinder 2115.

The wireform 2110 is positioned externally with respect to body section 2120 and has a first end 2130 adjacent to the lever 2125 and a second end 2135 adjacent to a first pin 2140. Additionally, the wireform 2110 includes one or more wraps 2145.

The cam 2105 has a rotational degree of freedom in that it can pivot about an axis L defined with respect to the center of a knob 2150. In a disengaged position the cam 2105 does not apply force against the lever 2125, thus the wireform 2110 is loosely positioned on the body section 2120 and the wraps 1850 are not frictionally engaged with an inner surface of the passage defined by the cylinder 2115. In this manner, the cylinder 2115 can freely rotate or slide axially in any direction in the disengaged position.

To engage the locking device 1800, the cam 2105 is rotated with respect to the axis L by adjusting the knob 2150. In this manner, the cam 2105 pushes against lever 2125, effectively pushing against the first end 2130 and causing the wireform 2110 to expand such that the wraps 2145 interfere with the inner surface of the passage defined in the cylinder 2115. In the engaged position the cylinder 2118 is secured by the first pin 2140 that prevents rotation of the cylinder in the CCW direction 2155 while the lever 2125 prevents rotation in the CW direction. The first pin additionally prevents axial movement of cylinder along a first axial direction 2160, where a stop pin 2165 prevents axial movement in the direction opposite of the first axial direction 2160.

In general, the example locking device 2100 can repeatedly be actuated between an engaged position and a disengaged position by an operator by adjusting the knob 2150 through 180 degrees of rotation.

Referring now to FIGS. 24-29, alternative embodiments of wireform construction that can be used with the example locking device 1800 (FIGS. 18-20) and example locking device 2100 (FIGS. 21-23) are shown.

In general, a wireform without a tension section will provide the highest holding torque in both directions. This is typically used to provide for a solid lock. A tension section can be added to either side or both sides of the wraps to selectively reduce the holding torque in the desired direction or in both directions.

Wireform 2405 is one example wireform that does not incorporate a tension section positioned near either a first end 1305 or a second end 2410.

Wireform 2600 is constructed with a first end 2605, a second end 2610 and a tension section 2615.

Wireform 2800 is an example illustrating two respective tension sections, 2805, 2810 such that a similar application of force would be required to rotate a cylinder each cylinder rotational direction.

Figure 30:
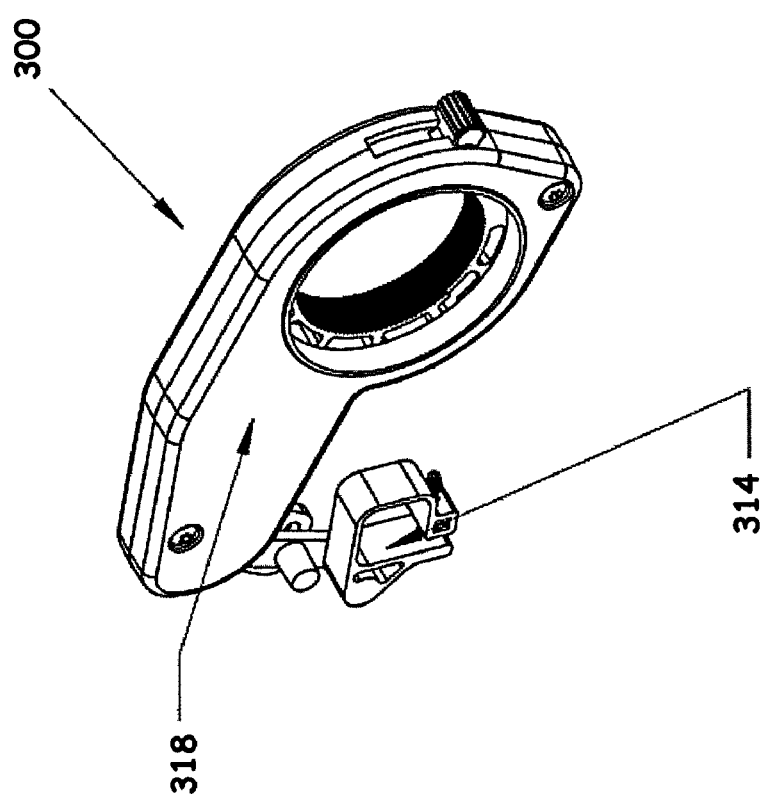
FIG. 30 is a perspective view of an example of a motorcycle throttle lock with a brake release mechanism.
Figure 31:
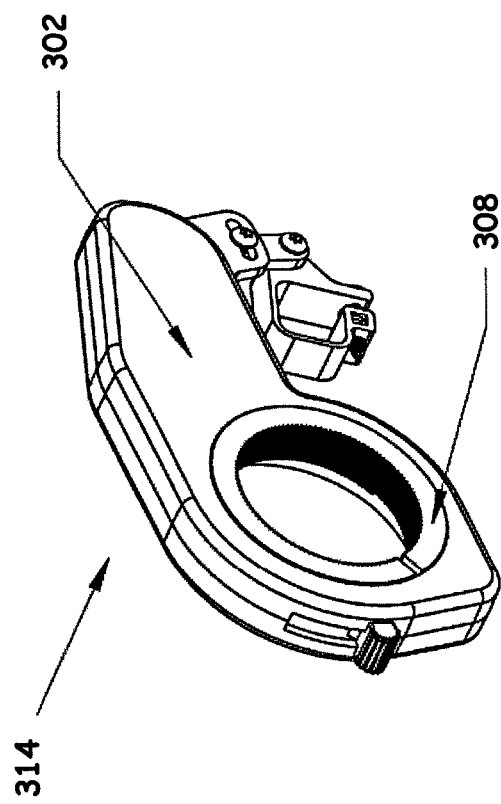
FIG. 31 is an alternate perspective view of the motorcycle throttle lock of FIG. 30.
Figure 32:
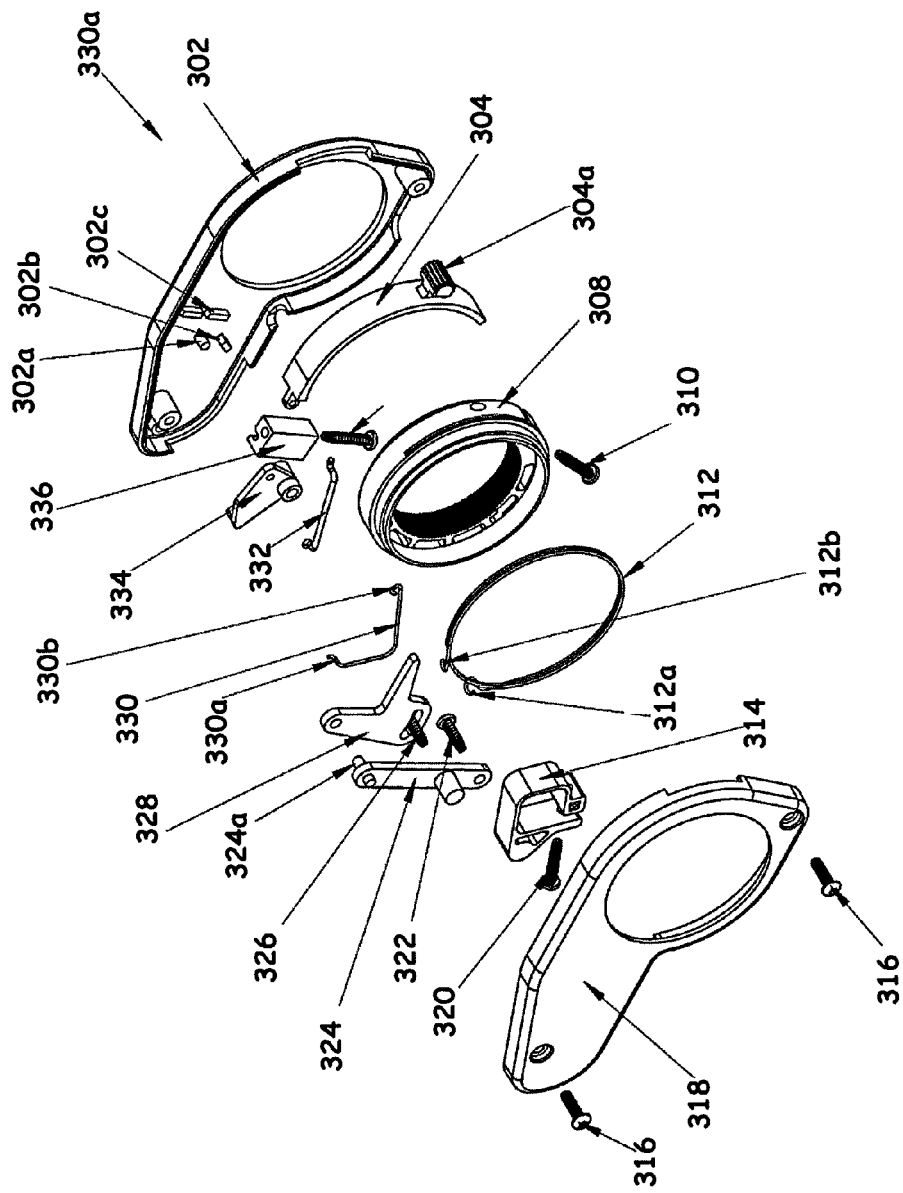
FIG. 32 is an exploded view of the throttle lock of FIG. 30.
Figure 33:
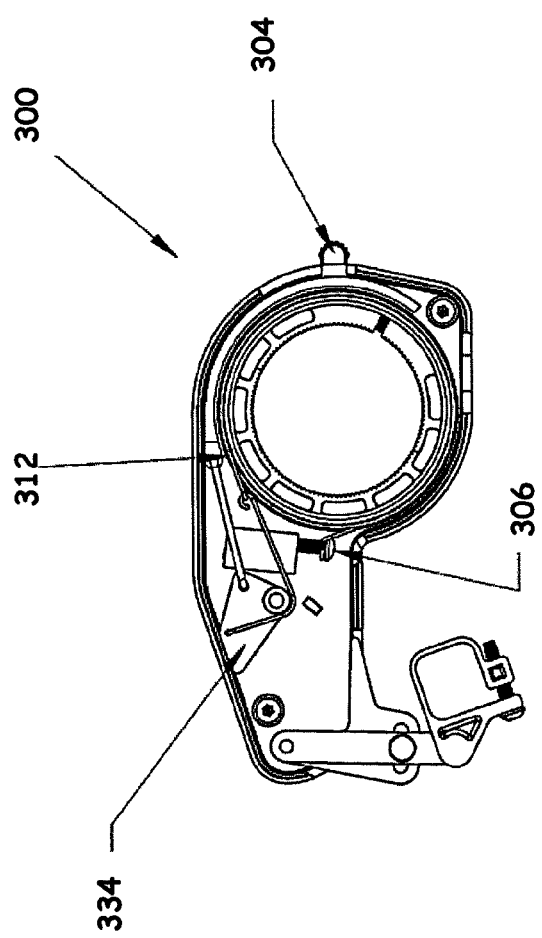
FIG. 33 is a frontal view of the throttle lock of FIG. 30 having a removed cover to show a disengaged position.
Figure 34:
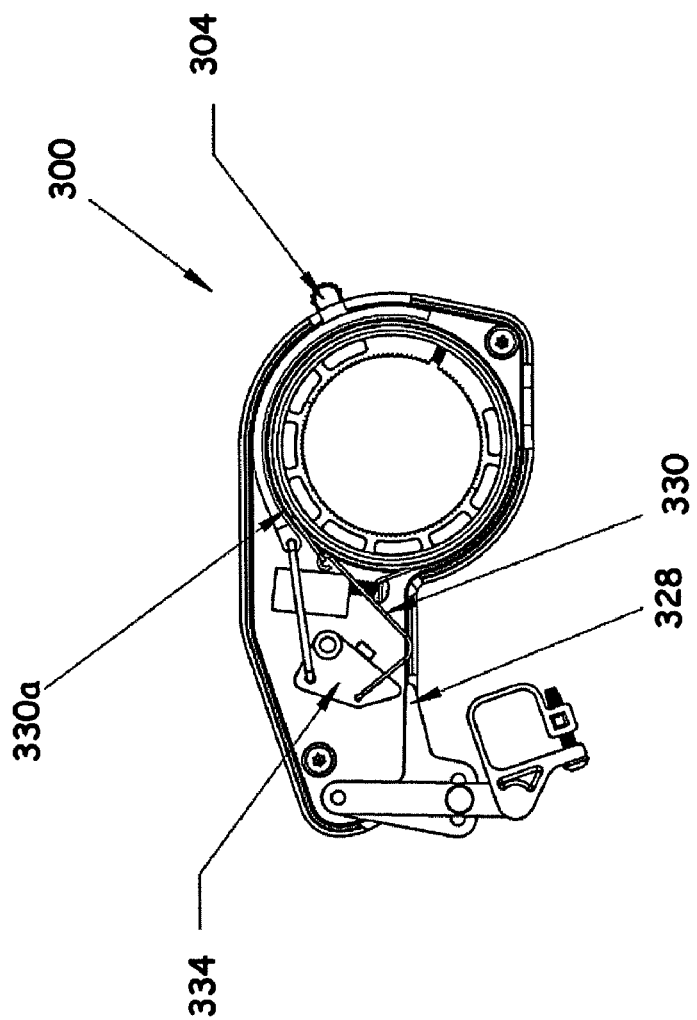
FIG. 34 is a frontal view of the throttle lock of FIG. 33 showing an engaged position.

Referring now to FIGS. 30-34, an example locking device 300 having features consistent with the present disclosure is depicted that can be utilized to hold a motorcycle throttle at a specified rotational position. More specifically, FIGS. 30, 31 and 32 illustrate respective left perspective, right perspective and exploded views of the example locking device 300. FIG. 33 illustrates a front view of the example locking device 300 without a cover, demonstrating a disengaged position and FIG. 34 illustrates a front view of the example locking device 300 without the cover demonstrating an engaged position.

In the example embodiment the locking device 300 includes a body section 302, a cylinder 308, a wireform 312, a tension wire 330, a lever 334 and a cover 318. In one aspect, the cylinder 308 is connected to a motorcycle throttle grip by a tightening screw 310 and additionally supports the body section 302 and the cover 318. In a disengaged position the tension wire 330 is loosely connected to the lever 334 by a first end 330a and loosely connected to a second end 312b on the wireform 312 by a third end 330b.

When the lever 334 is in a free position, as depicted in FIG. 33, the cylinder 308 is free to rotate in the wireform 312. When the lever 334 is rotated about a pivot 302a to a rotated position against a tab 302b, as depicted in FIG. 34, the tension wire 330 applies force to the wireform 312 that in turn reduces the diameter of the wireform 312 until it engages an outside diameter of the cylinder 308. In this position, the cylinder 308 will hold the motorcycle throttle in a locked position while allowing the motorcycle rider to adjust the throttle setting by application of a relatively low magnitude of torque.

The wireform 312 has a fourth end 312a that is connected to an adjustment screw 306. The adjustment screw 306 is connected to a plastic nut 336 that is connected to the body section 302 by a second tab 302c. The amount of torque holding the motorcycle throttle in position can be adjusted by turning the adjustment screw 306. The amount of torque that the rider has to overcome to increase the speed of the motorcycle will be determined by the stiffness of a tension spring 330. The fourth end 312a provides a relatively stiff connection, in contrast to the tension spring 330 that provides a relatively flexible connection. The stiffness differential between the fourth end 312a and the tension spring 330, in combination with the torque multiplying capability of one or more wraps of wireform 312, provide a rider the ability to set a desired holding torque to make it easy to increase or decrease the motorcycle speed while the locking device 300 is engaged.

A thumb slide 304 is connected to the lever 334 by a connecting wire 332. A knob 304a can be very easily moved with a motorcycle rider's thumb to rotate the lever 334 from the free position to a toggled position and then back to the free position. The toggled and free positions are sometimes referred to as engaged and disengaged positions, respectively. The term "toggled" as it relates to a position of the lever is defined as a rotated position beyond a toggle point. The toggle point is a rotated point at which the forces exerted by the wireform 312 change from working against movement of the lever into the free position to the forces exerted by the wireform 312 to hold the lever in the toggled position.

A release lever 328 is connected to a release arm 324 at the pivot 324a and a screw 326. The screw 326 provides an ability to set an angle of the release lever 328 with respect to the release arm 324, thereby enabling the locking device 300 to be easily adapted for use on different motorcycles. A connector 314 connects the release arm 324 to the hand brake lever of the motorcycle with screws 320 and 322. As the motorcycle hand brake lever is actuated, the release lever 328 engages the lever 334 translating the lever 334 to a free position, as shown in FIG. 33.

In the embodiment shown, the cover 318 and the body section 302 are connected to each other by a screw 316 and provide the basic apparatus for holding all the components of locking device 300 in the proper position.

Figure 35:
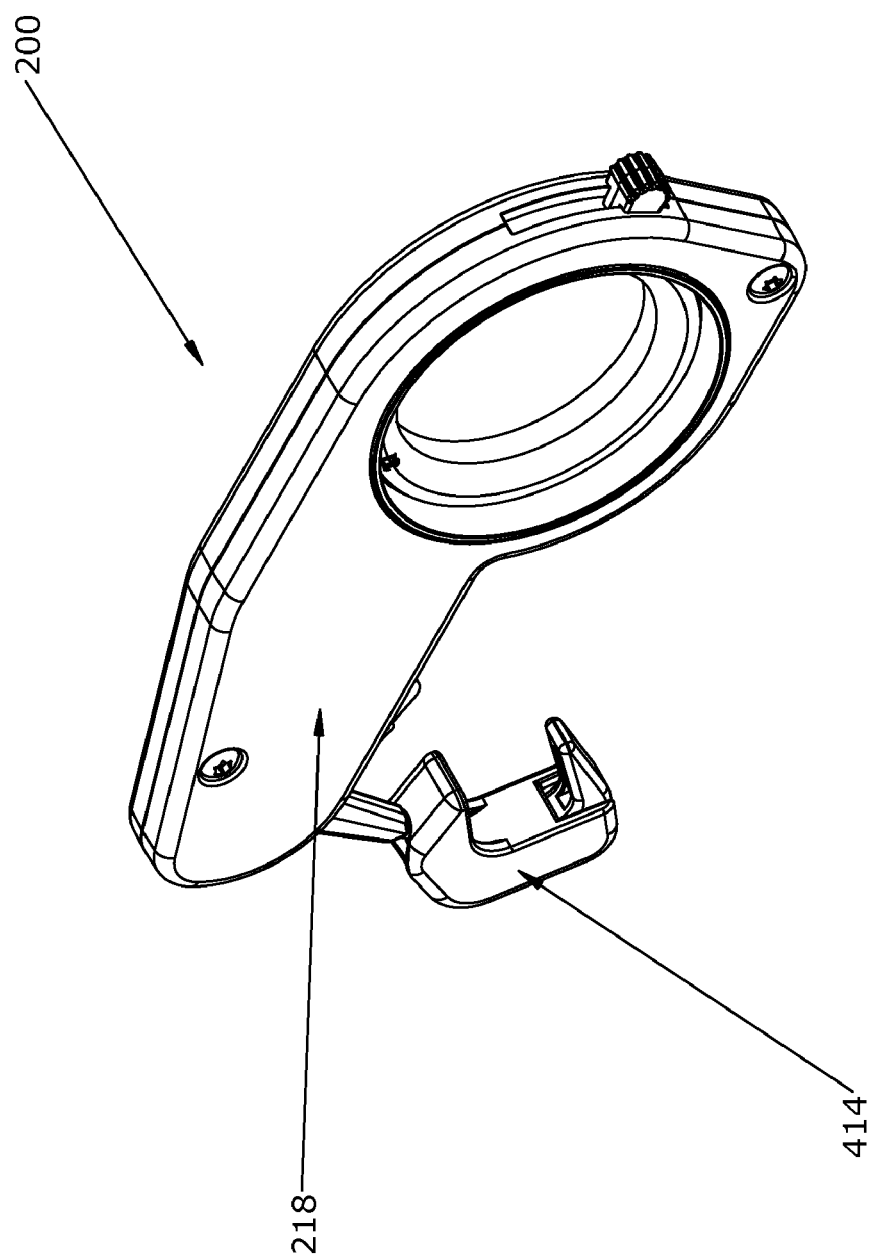
FIG. 35 is a perspective view of an example of a motorcycle throttle lock with a brake release mechanism showing alternate methods of mounting and adjusting the device to allow for a wide variety of motorcycle applications.
Figure 36:
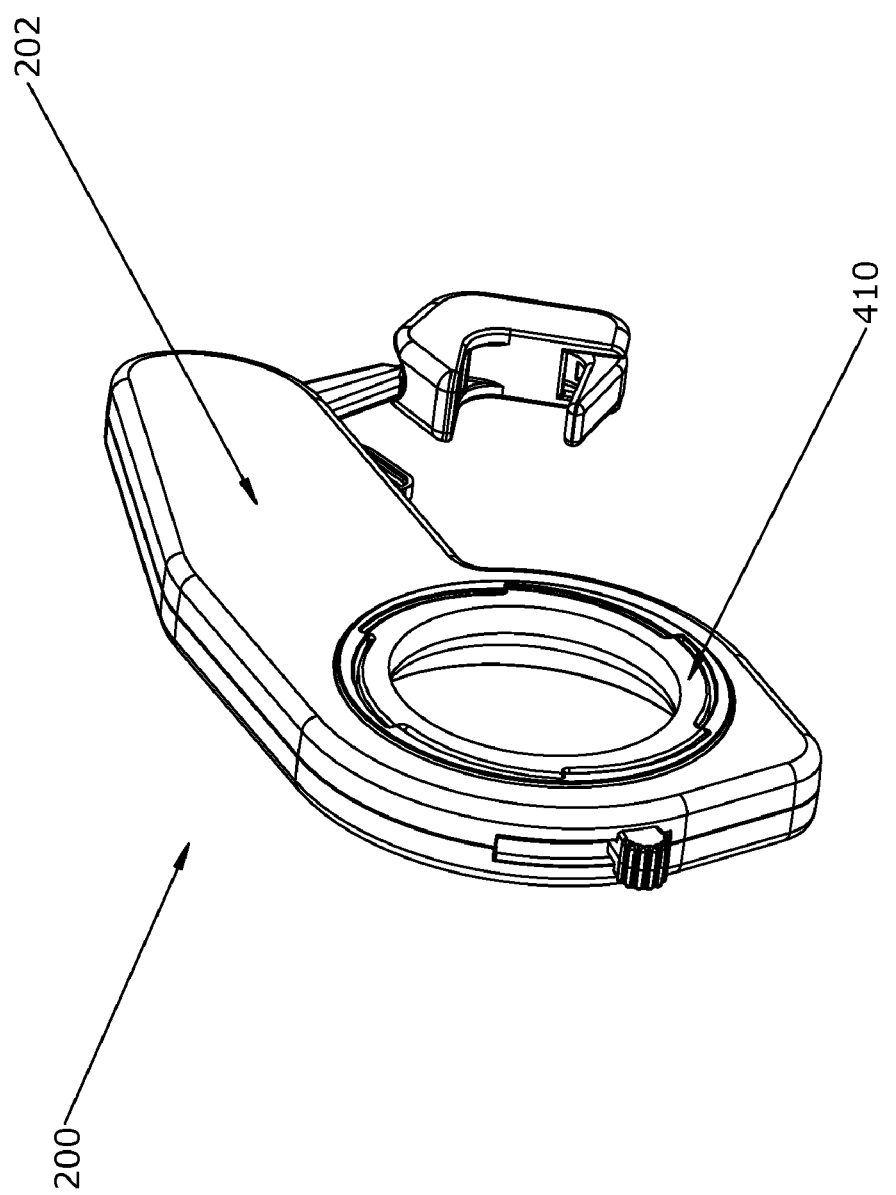
FIG. 36 is an alternate perspective view of the throttle lock of FIG. 35.
Figure 37:
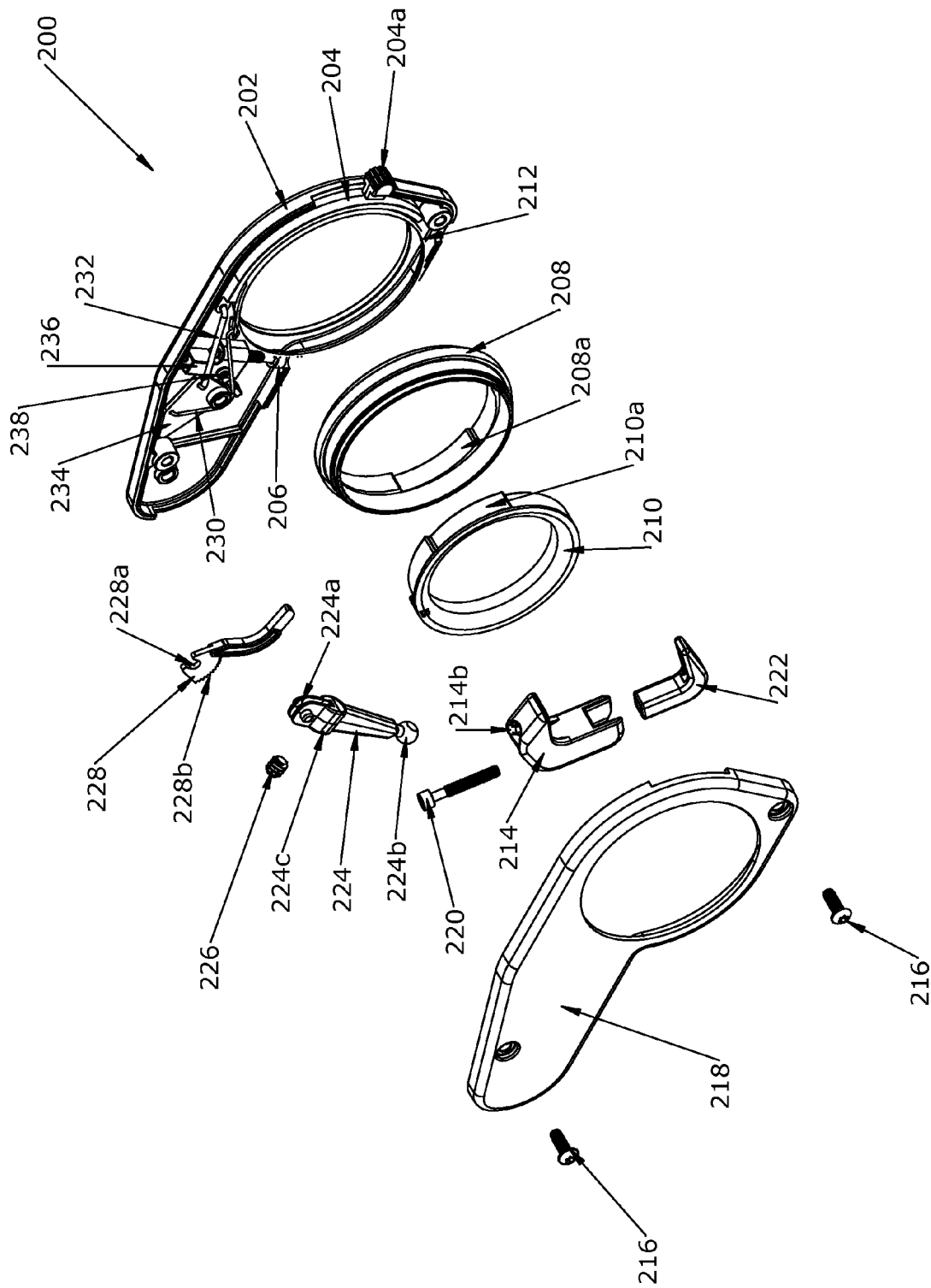
FIG. 37 is an exploded view of the throttle lock of FIG. 35.

Referring now to FIGS. 35-37, an alternative example locking device 400 having features consistent with the present disclosure is depicted that can be utilized to hold a motorcycle throttle at a specified rotational position. More specifically, FIGS. 35, 36 and 37 illustrate respective left perspective, right perspective and exploded views of the example locking device 400.

The operation of the example device 400 is the same as the example device 300 shown in FIGS. 30-34 with the exception of alternative features indicative of a preferred configuration. The example locking device 400 includes a body section 402, a cylinder 408, a hub 410, a wireform 412, a tension wire 430, a lever 434 and a cover 418. The cylinder 408 is engaged to a motorcycle throttle grip by rotating relative to the hub 410 so that a curved surface 408a is pressed against a curved surface 410a. In one example embodiment the hub 410 is a flexible material such as an ethylene-propylene-diene monomer (EPDM) rubber that can compress and solidly engage the cylinder 408 to a motorcycle hand throttle. The cylinder 408 loosely supports body 402 and the cover 418. The tension wire 430 is loosely connected to the lever 434 and loosely connected to the wireform 412.

The wireform 412 includes one end connected to an adjustment screw 406. The adjustment screw 406 is connected to a plastic nut 436 that is in turn connected to the body 402 by a screw 438. In general, the amount of torque holding the motorcycle throttle in position can be adjusted by turning the adjustment screw 406. Additionally, the amount of torque that a rider has to overcome to increase the speed of the motorcycle will be determined by the stiffness of tension wire 430.

A thumb slide 404 is connected to the lever 434 by a connecting wire 432. A knob 404a can be very easily moved by a motorcycle rider's thumb to rotate the lever 434 from a free position to a toggled position and back to the free position. A slot 428a positioned on a release lever 428 is connected to a release arm 424 at a pivot 424a. Additionally, a screw 426 located in a cavity 424c mates with threads 428b. The screw 426 provides an ability to set an angle of the release lever 428 with respect to the release arm 424 to enable the locking device 400 to be easily adapted for use on different motorcycles. A connector 414 loosely holds the release arm 424 with a ball 424b in socket 414b. The connector 414 is fastened to the hand brake lever of the motorcycle with a screw 420 and a clamp 422. As the motorcycle hand brake lever is actuated, the release lever 428 engages the lever 434 and moves the lever 434 to the free position.

In the embodiment shown, the cover 418 and the body section 402 are connected to each other by screws 416 and provide the basic apparatus for holding all the components of locking device 400 in the proper position.

Figure 38:
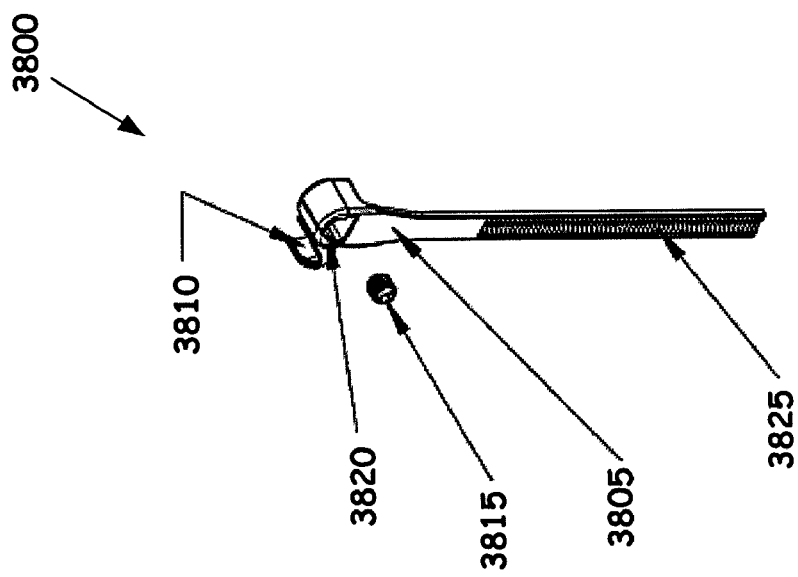
FIG. 38 is a perspective view of a brake lever connector.

Referring now to FIG. 38, a perspective view of an alternative implementation 3800 of the connecting release lever 424, as described with reference to FIG. 37, is depicted. In general, a connector 3805 has a socket 3810 that loosely connects to the ball 424b. A screw 3815 is located in a cavity 3820 and a section 3825 includes threads and is flexible so that it can be wrapped around the hand brake lever and slid into the cavity 2950c. The screw 3815 is used to tighten section 3825 around a motorcycle hand brake lever. The connector 3805 can be molded in a simple two-plate molding die that does not need additional slides. In one embodiment the connector 3805 can be made of an injection molding plastic.

Figure 39:
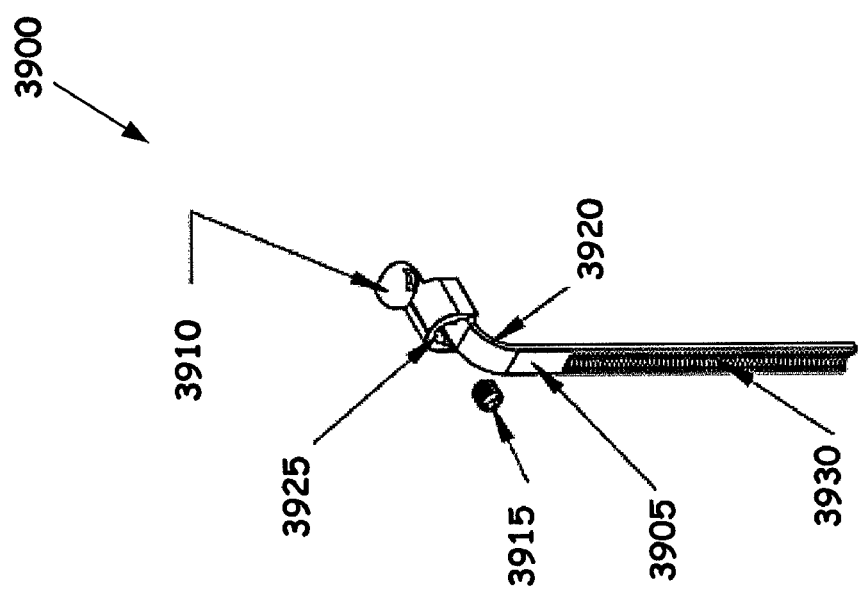
FIG. 39 is a perspective view of an alternate brake lever connector.

Referring now to FIG. 39, a perspective view of a second alternative implementation 3900 of the connecting release lever 324, as described with reference to FIG. 37, is depicted. In general, a connector 3905 includes a socket 3910, which connects to the ball 424b, is symmetrically located with respect to a screw 3915 that is located in a cavity 3925. The connector 3905 is molded with a bend 3920 that allows for the use of a simple two-plate molding die that does not need additional slides. The screw 3915 is used to tighten section 3930 around a motorcycle hand brake lever. The connector 3905 can also be molded in a simple two-plate molding die that does not need additional slides.

The various embodiments described above are provided by way of illustration only and should not be construed as limiting. Various modifications and changes that may be made to the embodiments described above without departing from the true spirit and scope of the disclosure.

The invention claimed is:

1. A locking device comprising:
   a rotatable cylinder;
   a body member;
   a lever mounted to the body member, the lever being rotatable between an engaged position and a disengaged position; and
   a shaped wireform having a wrap portion and opposing first and second ends, the wrap portion being arranged concentric with the cylinder, the first end being mounted to the body member, and the second end being mounted to the lever, wherein when the lever is in the engaged position the wireform engages a surface of the cylinder to limit rotation of the cylinder, and when the wireform is in the disengaged position the wireform permits rotation of the cylinder; and
   wherein the locking device is mounted to a rotatable throttle of a motorcycle to hold the throttle in a predetermined rotated position when the device is in the engaged position.

2. The locking device of claim 1, wherein the wrap portion includes at least one 360 degree wrap.

3. The locking device of claim 1, wherein rotatability of the cylinder when the wireform is in the engaged position is dependent on at least a number of wraps of the wrap portion, a tension force in the wireform, and a coefficient of friction of materials of the cylinder and the wireform.

4. The locking device of claim 1, wherein in the engaged position the wireform is pulled in tension to cause interference with the cylinder.

5. The locking device of claim 1, wherein in the engaged position the wireform is moved into a compressed state to cause interference with the cylinder.

6. A wireform clamp locking device comprising:
   a body section having a first aperture;
   a rotatable cylinder positioned through the first aperture of the body section;
   a lever rotatably connected to the body section; and
   a shaped wireform having at least one wrap of a wrapped section selectively engageable to a surface of the cylinder, wherein a first end of the wireform is connected to the lever and a second end of the wireform is connected to a portion of the body section, and rotation of the lever moves the wireform between engaged and disengaged positions; and
   wherein the locking device is mounted to a rotatable throttle of a motorcycle to hold the throttle in a predetermined rotated position when the device is in the engaged position.

7. The locking device of claim 6, wherein the wireform comprises of at least one tension section.

8. The locking device of claim 7, wherein the tension section is a spring that is connected between the wireform and the lever.

9. The locking device of claim 6, wherein in the engaged position the wireform is pulled in tension into interference with the cylinder and in the disengaged position the wireform is loosely engaged with the cylinder.

10. The locking device of claim 6, wherein in the engaged position a magnitude of torque required to rotate the cylinder in each of a counterclockwise and a clockwise direction is dependent on a construction of at least one of the wireform and the cylinder.

11. The locking device of claim 10, wherein the magnitude of torque is a function of at least one of:
   a total number of wraps of the wrapped section;
   a diameter of cylinder; and
   a coefficient of friction between the cylinder and the wrapped section.

12. The locking device of claim 6, wherein in the disengaged position the cylinder freely rotates in each of a clockwise and a counterclockwise direction.

13. The locking device of claim 6, further comprising an axial restraint member, the axial restraint member being configured to limit axial movement of the cylinder relative to the body section.

* * * * *